US012713139B2

(12) United States Patent
Kim et al.

(10) Patent No.: US 12,713,139 B2
(45) Date of Patent: Aug. 18, 2026

(54) ELECTRONIC DEVICE AND METHOD FOR ADJUSTING DISPLAY AREA OF DISPLAY ON BASIS OF INTENSITY OF LIGHT EMITTED FROM DISPLAY

(71) Applicant: Samsung Electronics Co., Ltd., Suwon-si (KR)

(72) Inventors: Seonghun Kim, Suwon-si (KR); Byunghun Oh, Suwon-si (KR); Seyeong Cheon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 58 days.

(21) Appl. No.: 18/823,234

(22) Filed: Sep. 3, 2024

(65) Prior Publication Data

US 2024/0430580 A1 Dec. 26, 2024

Related U.S. Application Data

(63) Continuation of application No. PCT/KR2023/002560, filed on Feb. 22, 2023.

(30) Foreign Application Priority Data

Apr. 20, 2022 (KR) ........................ 10-2022-0049182
May 17, 2022 (KR) ........................ 10-2022-0060498

(51) Int. Cl.
*H04N 23/74* (2023.01)
*H04N 23/53* (2023.01)
*H04N 23/71* (2023.01)

(52) U.S. Cl.
CPC ............ *H04N 23/74* (2023.01); *H04N 23/53* (2023.01); *H04N 23/71* (2023.01)

(58) Field of Classification Search
CPC ........ H04N 23/74; H04N 23/53; H04N 23/71; H04N 23/60; H04N 23/63; H04N 23/90;
(Continued)

(56) References Cited

U.S. PATENT DOCUMENTS 9,357,042 B2 5/2016 Liao
9,485,398 B2 11/2016 Patel
(Continued)

FOREIGN PATENT DOCUMENTS

KR 20200032411 A 3/2020
KR 20200089593 A 7/2020
(Continued)

OTHER PUBLICATIONS

International Search Report for PCT/KR2023/002560 mailed May 30, 2023, 7 pages.

(Continued)

*Primary Examiner* — Abdelaaziz Tissire
(74) *Attorney, Agent, or Firm* — Nixon & Vanderhye P.C.

(57) ABSTRACT

An electronic device, according to an embodiment, may comprise: a display; a camera of which at least a portion is visible to the outside through an opening formed in a display area of the display; a memory which stores instructions; and at least one processor, comprising processing circuitry, which is operably coupled to the display, the camera, and the memory. At least one processor may be configured to execute the instructions and may be configured to: control the display to display a screen including an area having a designated color in the display on the basis of receiving a shooting input; identify a change in light received by the camera according to an extent of the area while the screen is displayed; and acquire an image corresponding to the
(Continued)

shooting input by controlling the camera in a state in which the extent of the area is adjusted on the basis of the identified change in light.

18 Claims, 13 Drawing Sheets

(58) Field of Classification Search
CPC .... H04N 23/57; H04N 5/2354; H04N 5/2351; G06F 1/1616; G06F 1/1624; G06F 1/1652; G06F 1/1677; G06F 1/1686; G06F 3/005; G06F 3/013; G06F 3/14; G06F 3/01; H04M 1/725; H04M 1/02; H04M 1/72454; G09G 5/00; G09G 2320/0686; G09G 2320/08
See application file for complete search history.

(56) References Cited

U.S. PATENT DOCUMENTS 9,706,126 B2 7/2017 Cho et al.
9,756,257 B2 9/2017 Tan et al.
10,397,470 B2 8/2019 Ciudad et al.
10,962,843 B2* 3/2021 Wu .................... G06F 1/1686
11,140,250 B2* 10/2021 Li .................... H04M 1/0264
11,375,129 B2 6/2022 Ou et al.
11,445,097 B2 9/2022 Ko et al.
11,508,339 B2 11/2022 Jeong et al.
11,514,872 B2 11/2022 Yang et al.
11,595,586 B2 2/2023 Lee et al.
11,687,126 B2* 6/2023 Chang .................... G06F 1/1686 345/156
2007/0159449 A1* 7/2007 Yoo .................... G09G 3/3406 345/102
2012/0327172 A1* 12/2012 El-Saban .................... G06T 7/174 348/14.02
2015/0163410 A1* 6/2015 Yamazaki .................... H04N 23/63 348/333.11
2015/0206507 A1* 7/2015 Kwon .................... G09G 3/3426 345/102
2015/0229844 A1* 8/2015 Yamazaki .................... G03B 15/05 348/333.01
2016/0337570 A1* 11/2016 Tan .................... G06F 3/01
2017/0084231 A1* 3/2017 Chew .................... G09G 3/20
2019/0369422 A1* 12/2019 Zeng .................... G02F 1/139
2021/0096611 A1* 4/2021 Schenone .................... H04N 23/632
2021/0105389 A1* 4/2021 Ko .................... G06F 3/04845
2021/0120112 A1* 4/2021 Li .................... H10K 59/40
2021/0174769 A1* 6/2021 Jeong .................... G09G 5/373
2021/0258467 A1* 8/2021 Lee .................... H04N 23/45
2023/0412920 A1* 12/2023 Yoo .................... G06F 1/16

FOREIGN PATENT DOCUMENTS

KR 102153436 B1 9/2020
KR 20210041271 A 4/2021
KR 20210072498 A 6/2021
KR 20210105762 A 8/2021
RU 2706461 C1 * 11/2019 .................... G09G 5/02
WO 2021/047325 A1 3/2021

OTHER PUBLICATIONS

Written Opinion of the ISA for PCT/KR2023/002560 mailed May 30, 2023, 6 pages.
Extended European Search Report dated Apr. 24, 2025 issued in European Patent Application No. 23792001.2.

* cited by examiner

ELECTRONIC DEVICE AND METHOD FOR ADJUSTING DISPLAY AREA OF DISPLAY ON BASIS OF INTENSITY OF LIGHT EMITTED FROM DISPLAY

CROSS-REFERENCE TO RELATED APPLICATIONS

This application is a continuation of International Application No. PCT/KR2023/002560 designating the United States, filed on Feb. 22, 2023, in the Korean Intellectual Property Receiving Office and claiming priority to Korean Patent Application Nos. 10-2022-0049182, filed on Apr. 20, 2022, and 10-2022-0060498, filed on May 17, 2022, in the Korean Intellectual Property Office, the disclosures of each of which are incorporated by reference herein in their entireties.

BACKGROUND

Field

The disclosure relates to an electronic device and method for adjusting a display area of a display on basis of intensity of light emitted from the display.

Description of Related Art

With the recent development of technology, an electronic device such as a smartphone or a tablet personal computer (PC) is reducing a bezel portion and increasing a size of a display area of a display in order to provide a wide screen. In order to increase an extent of the display area of the display, for example, an electronic device having a deformable form factor is being developed, using a flexible display. An image sensor, an illumination sensor, a humidity sensor, and/or a fingerprint recognition sensor, and the like for implementing a camera are placed on the front surface of a portable electronic device such as the smartphone or the tablet PC, overlapping at least a portion of the display.

SUMMARY

According to an example embodiment, an electronic device may include: a display, a camera at least partially visible outside through an opening formed in a display area of the display, a memory storing instructions, and at least one processor, comprising processing circuitry, operably coupled to the display, the camera, and the memory. At least one processor, individually and/or collectively may be configured to execute the instructions and may be configured to: control the display to display a screen including a portion with a specified color in the display, based on receiving a shooting input; identify a change of light received by the camera, according to an extent of the portion, based on the screen being displayed; and obtain an image corresponding to the shooting input, by controlling the camera, in a state in which the extent of the portion is adjusted based on the identified change of the light.

According to an example embodiment, the electronic device may include: a display, a camera at least partially visible outside through the opening formed in the display area of the display, a memory storing instructions, and at least one processor, comprising processing circuitry, operably coupled to the display, the camera, and the memory. At least one processor, individually and/or collectively, is configured to execute the instructions and may be configured to: control the display to display a first screen to display a preview image received from the camera, in the display; control the display to repeatedly display a second screen, including a first portion having a first preset color, and including a second portion having a second specified color different from the first preset color and including the opening, overlapping on the first screen, in response to receiving the shooting input, based on displaying the first screen; identify a change of brightness of the preview image according to light emitted from the first portion, by adjusting an extent of the first portion, based on displaying repeatedly the second screen; and obtain the image corresponding to the shooting input, using the first portion in the second screen, having an extent of the first portion adjusted based on the change of the brightness.

According to an example embodiment, a method of operating an electronic device may include: displaying a screen including a portion with a specified color in the display, based on receiving the shooting input; identifying the change of light received by a camera according to an extent of the portion, based on the screen being displayed; and obtaining the image corresponding to the shooting input, by controlling the camera, in a state in which the extent of the portion is adjusted based on the identified change of light.

According to an example embodiment, a method of operating an electronic device may include: displaying a first screen to display the preview image received from a camera, in a display; repeatedly displaying a second screen, including a first portion having a first specified color, and including the second portion having a second specified color different from the first specified color and including an opening, overlapping on the first screen, in response to receiving the shooting input, based on displaying the first screen; identifying a change of the brightness of the preview image according to light emitted from the first portion, by adjusting an extent of the first portion, based on repeatedly displaying the second screen; and obtaining the image corresponding to the shooting input, using the first portion in the second screen, having the extent of the first portion adjusted based on the change of the brightness.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, various example embodiments of present disclosure are described in greater detail with reference to the attached drawings.

Figure 1:
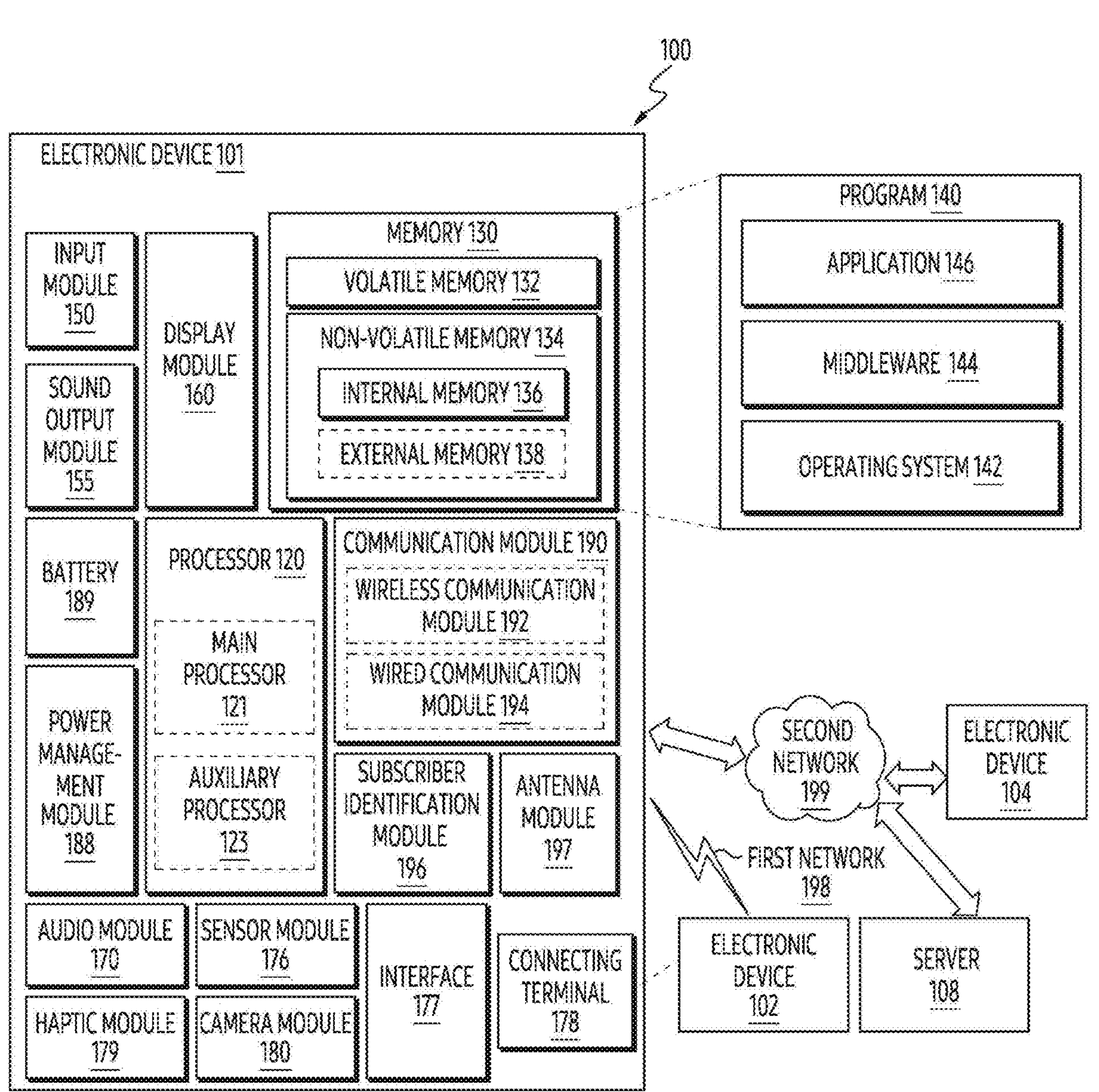
FIG. 1 is a block diagram illustrating an example electronic device in a network environment, according to various embodiments.

FIG. 1 is a block diagram illustrating an example electronic device in a network environment, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term docs not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
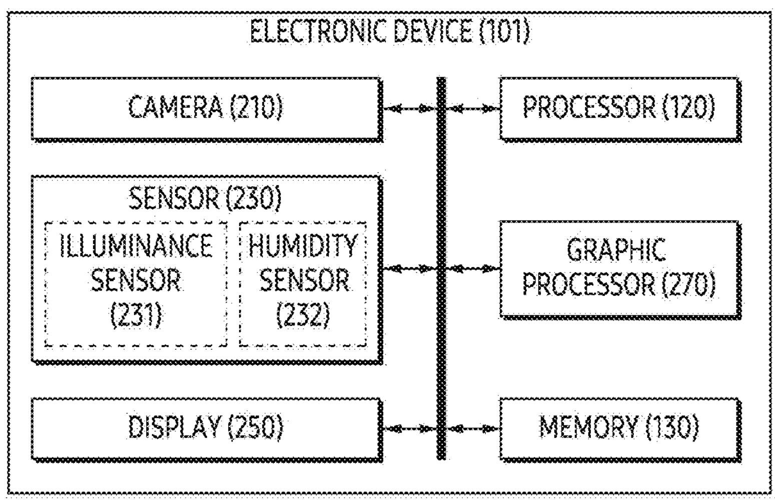
FIG. 2 is a block diagram illustrating an example configuration of an electronic device according to various embodiments.

FIG. 2 is a block diagram illustrating an example configuration of an electronic device 101 according to various embodiments. The electronic device 101 of FIG. 1 may be an example of the electronic device 101 of FIG. 2. According to an embodiment, the electronic device 101 may be a terminal owned by a user. For example, the terminal may include the electronic device such as a smartphone, a smart pad, and a tablet personal computer (PC).

Referring to FIG. 2, according to an embodiment, the electronic device 101 may include at least one of a processor (e.g., including processing circuitry) 120, a memory 130, a camera 210, a sensor 230, a display 250, and a graphic processor (e.g., including processing circuitry) 270. The sensor 230 may include at least one of a humidity sensor 232 and an illuminance sensor 231. The processor 120, the memory 130, the camera 210, the sensor 230, the display 250, and the graphic processor 270 may be electronically and/or operably coupled with each other by an electronical component such as a communication bus (not illustrated). Although illustrated based on different blocks, the disclosure is not limited thereto, and a portion of hardware components (e.g., at least a portion of the processor 120 and the graphic processor 270) illustrated in FIG. 2 may be included in a single integrated circuit, such as a system on a chip (SoC). The type and/or number of hardware component included in the electronic device 101 are not limited to those illustrated in FIG. 2. For example, the electronic device 101 may include only the portion of the hardware components illustrated in FIG. 2. According to an embodiment, the electronic device 101 may include one or more housings for accommodating at least one of the hardware components of FIG. 2.

The processor 120 of the electronic device 101 according to an embodiment may include a hardware component for processing data based on one or more instructions. For example, the hardware component for processing data may include an arithmetic and logic unit (ALU), a floating point unit (FPU), a field programmable gate array (FPGA), and/or a central processing unit (CPU). The number of processor 120 may be one or more. For example, the processor 120 may have a structure of a multi-core processor such as a dual core, a quad core, or a hexa core. The processor 120 of FIG. 2 may include the processor 120 of FIG. 1. In an embodiment, the processor 120 may be referred to as an application processor (AP) and/or a first processor. The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

According to an embodiment, the memory 130 of the electronic device 101 may include the hardware component for storing data and/or instructions input and/or output to the processor 120. For example, the memory 130 may include a volatile memory such as Random-Access Memory (RAM) and/or a non-volatile memory such as Read-Only Memory (ROM). For example, the volatile memory may include at least one of Dynamic RAM (DRAM), Static RAM (SRAM), Cache RAM, and Pseudo SRAM (PSRAM). For example, the non-volatile memory may include at least one of Programmable ROM (PROM), Erasable PROM (EPROM), Electrically Erasable PROM (EEPROM), flash memory, hard disk, compact disk, and embedded multi-media card (eMMC). The memory 130 of FIG. 2 may include the memory 130 of FIG. 1.

In the memory 130, one or more instructions representing a calculation and/or an operation to be performed by processor 120 on data may be stored. A set of one or more instructions may be referred to as firmware, an operating system, process, routine, sub-routine, and/or an application. For example, the electronic device 101 and/or the processor 120 may perform at least one of the operations of FIGS. 6, 7, and 10 to 11 when a set of a plurality of instruction distributed in the form of the operating system, firmware, driver, and/or the application is executed. Hereinafter, the fact that the application is installed in the electronic device 101 may refer, for example, to one or more instructions provided in the form of the application being stored in the memory 130 of the electronic device 101, and the one or more applications are stored in an executable format (e.g., a file having an extension designated by the operating system of the electronic device 101) by the processor 120 of the electronic device 101.

According to an embodiment, the display 250 of the electronic device 101 may output visualized information to the user. For example, the display 250 may be controlled by the processor 120 and may output visualized information to the user. For example, the visualized information may be generated by the application being executed by the processor 120 of the electronic device 101. For example, the display 250 may be controlled by a controller such as a GPU (e.g., the graphic processor 270) included in the processor 120 or placed in the electronic device 101 independently of the processor 120, and may output visualized information to the user. The display 250 may include a Flat Panel Display (FPD), and/or electronic paper. The FPD may include a Liquid Crystal Display (LCD), a Plasma Display Panel (PDP), and/or one or more Light Emitting Diode (LED). The LED may include an Organic LED (OLED). In an embodiment, the display 250 of the electronic device 101 may be a deformable flexible display. In an embodiment in which the display 250 is a flexible display, the electronic device 101 may include a hinge assembly and/or a driving unit assembly for deforming the electronic device 101 and/or the display 250. An embodiment in which the display 250 is the flexible display will be described in greater detail below with reference to FIGS. 8A, 8B, 9A, 9B and 10.

According to an embodiment, the display 250 of the electronic device 101 may include a sensor (e.g., a touch sensor panel (TSP)) for detecting an external object (e.g., a finger of the user) on the display 250. For example, based on the TSP, the electronic device 101 may detect the external object in contact with the display 250 or floating on the display 250. In response to detecting the external object, the electronic device 101 may execute a function related to a specific visual object corresponding to a position of the external object on the display 250 among the visual objects displayed in the display 250.

The camera 210 of the electronic device 101 according to an embodiment may correspond to a camera module 180 of FIG. 1.

At least a portion of the camera 210 of the electronic device 101 according to an embodiment may be placed to overlap at least a portion of the display 250. In an embodiment, the camera 210 may be placed under an opening formed between pixels of the display 250 and receive light through the opening. The camera 210 placed under the opening may be referred to as a hall camera. In an embodiment, the camera 210 may be disposed under the pixels on the display 250, independently of the opening. The camera 210 disposed under the pixels independently of the opening may be referred to as an under display camera (UDC). In order to capture and/or obtain an image using the UDC, the electronic device may control diodes (e.g., OLED) and/or pixels included in at least a portion of the display overlapping the UDC.

According to an embodiment, the camera 210 may be placed to overlap the display 250, and/or may be placed on a surface different from a surface on which the display 250 is placed. One or more optical sensors (e.g., a Charged Coupled Device (CCD) sensor and a Complementary Metal Oxide Semiconductor (CMOS) sensor) that generate an electronic signal representing a color and/or brightness of light may be included. A plurality of optical sensors included in the camera 210 may be placed in a form of 2 dimensional array. The camera 210 may generate an image including the plurality of pixels arranged in 2 dimensions, corresponding to light reaching the optical sensors of 2D array by substantially simultaneously obtaining the electronic signal of each of the plurality of optical sensors. For example, photo data captured using the camera 210 may refer, for example, to one image obtained from the camera 210. For example, video data captured using the camera 210 may refer, for example, to a sequence of the plurality of images obtained according to a preset frame rate from the camera 210. According to an embodiment, the electronic device 101 may further include a flash light placed in a direction in which the camera 210 receives light and output light in the direction.

The graphic processor 270 of the electronic device 101 according to an embodiment may include various processing circuitry and may be an example of a graphics processing unit. The graphic processor 270 may perform a graphic operation based on a shader and output a result value to the display 250. Hereinafter, the graphic processor 270 may be referred to as an auxiliary processor and/or a second processor.

The sensor 230 of the electronic device 101 according to an embodiment may be referred to a sensor module 176 of FIG. 1. Electronic information that may be processed by the processor 120 and/or the memory 130 may be generated from non-electronic information related to the electronic device 101. The electronic information generated by the sensor 230 may be stored in the memory 130, processed by the processor 120, and/or transmitted to another electronic device distinguished from the electronic device 101. For example, the sensor 230 may include a global positioning system (GPS) sensor for detecting a geographic location of the electronic device 101, the illuminance sensor 231 for measuring brightness of ambient light, or a humidity sensor 232 for measuring humidity of surrounding environment of the electronic device 101. Embodiment of the electronic device 101 is not limited to the type and/or number of one or more sensors illustrated in FIG. 2.

According to an embodiment, the electronic device 101 may obtain information dependent on a state of the electronic device 101 from one or more sensors included in the sensor 230. For example, the processor 120 may identify surrounding environment of the electronic device 101 from sensor data of one or more sensors. According to an embodiment, the illuminance sensor 231 may output the electronic signal representing intensity (or amount of light) of light reaching at least a portion of the illuminance sensor 231 exposed to outside. For example, the illuminance sensor 231 may output sensor data representing brightness of ambient light of the electronic device 101. The illuminance sensor 231 may include a component having a photoelectric effect in which electrons are generated and conductivity changes when receiving ambient light. The illuminance sensor 231 may be an example of a CdS sensor using cadmium sulfide as the component. The electronic device 101 may adjust brightness of the display 250 based on intensity of light using the illuminance sensor 231.

The humidity sensor 232 according to an embodiment may output sensor data representing humidity included in surrounding environment of the electronic device 101. The humidity sensor 232 may include a sensor that measures a relative humidity and/or a sensor that measures an absolute humidity. The humidity sensor 232 may measure a change in capacitance and/or resistance according to humidity and output an electronic signal representing the humidity. The humidity may change according to weather of surrounding environment of the electronic device 101. For example, the weather of surrounding environment may refer, for example, to weather according to rain, fog, and/or fine dust.

According to an embodiment, the electronic device 101 may use at least one processor (e.g., the processor 120 and/or the graphic processor 270) and adjust at least one of the shape, size, or extent of a portion in which light is emitted from the display 250 based on intensity of light received through the camera 210 and/or sensor 230. Adjusting at least one of the form, size, or extent of the portion by the electronic device 101 may be performed to prevent and/or reduce scattering included in the image to be captured using the camera 210 and caused by the light emitted from the display 250.

Figure 3:
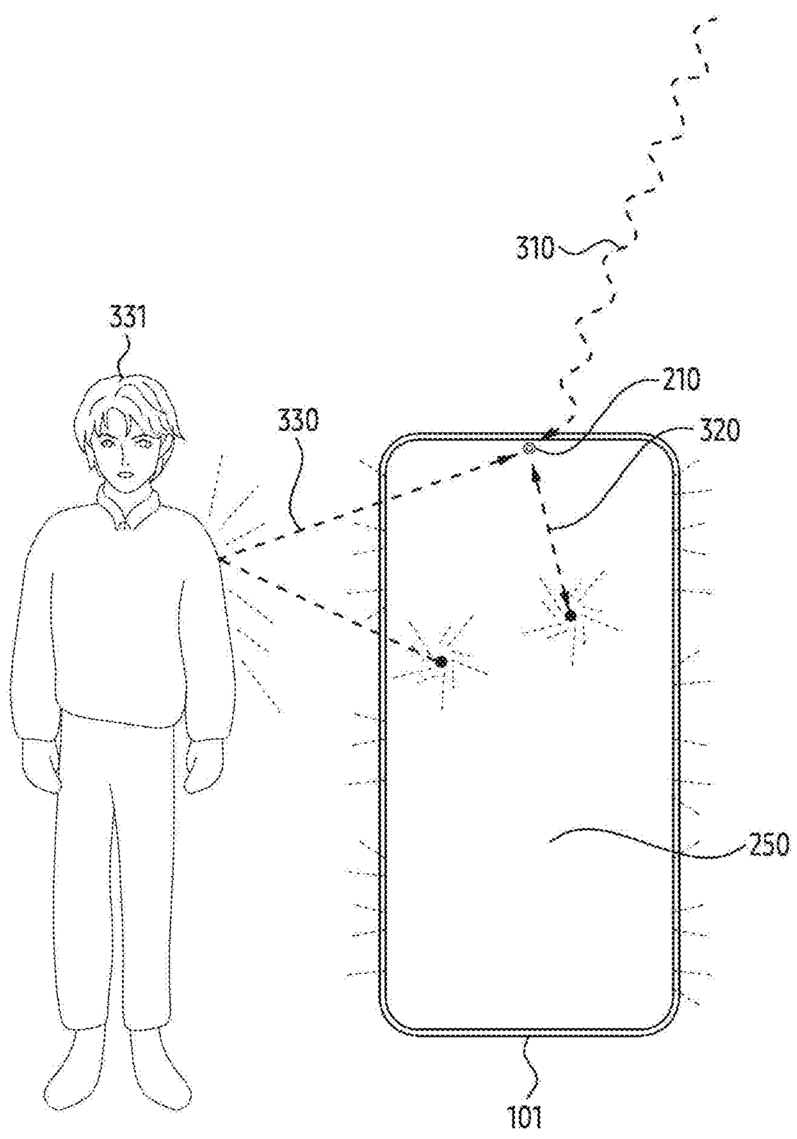
FIG. 3 is a diagram illustrating a plurality of type of light that an electronic device receives through a camera lens, according to various embodiments.

FIG. 3 is a diagram illustrating a plurality of type of light that an electronic device 101 receives through a camera lens, according to various embodiments.

The electronic device 101 according to an embodiment may be an example of the electronic device 101 of FIG. 2. A camera 210 may be referred to a camera 210 of FIG. 2. A display 250 may be an example of a display 250 of FIG. 2. At least a portion of the camera 210 may be placed to overlap at least a portion of a displaying area of the display. The display area of the display may refer, for example, to a portion formed by pixels placed on a portion where the display 250 is exposed to outside, among pixels included in the display. The camera 210 may include at least one lens and/or sensor (e.g., a sensor 230 of FIG. 2). For example, the camera 210 may include an image sensor.

According to an embodiment, the electronic device 101 may identify intensity of light received through some cameras 210 overlapping the display area of the display. For example, light received by the camera 210 may include at least one of ambient light 310, display light 320, and/or reflected light 330.

Referring to FIG. 3, the ambient light 310 according to an embodiment may refer to light emitted from surrounding environment of the electronic device 101 toward the camera 210. The ambient light 310 may be an example of indirect light that is recognized by reflecting at least one light emitted from a specific light source on at least one object around the electronic device 101. The ambient light 310 may have smaller intensity of light than direct light directly projected from a specific light source to the electronic device 101.

The display light 320 according to an embodiment may include light directly transmitted from the pixel toward the camera 210 while at least one pixel included in the display 250 is in an active state. The liquid crystal film according to an embodiment may be attached to the display 250 to protect the display 250 from external impact. A direction of light emitted from the display 250 may be changed by the liquid crystal film, and/or the emitted light may be scattered. For example, the light emitted from the display 250 may be scattered by the liquid crystal film attached to the display 250. The portion of the scattered light may be directly projected onto the camera 210. The display light 320 may be an example of direct light directly projected from the display 250 onto the camera 210. The electronic device 101 may identify distortion of the image caused by the display light 320. According to an embodiment, the electronic device 101 may perform an operation to be described in greater detail below with reference to FIGS. 4 to 11 in order to compensate for the identified distortion.

According to an embodiment, the electronic device 101 may receive the display light 320 through the camera 210 by light emitted from the display area of the display. For example, the display area of the display may be divided into an active portion of the display and/or an inactive portion of the display. As an example, the active portion may refer, for example, to a partial portion included in the display area in which pixels controlled by an electronic device (or a processor) emit light. The inactive portion may refer, for example, to a partial portion of the display area of the display 250 including a portion (e.g., an opening) where the camera 210 is exposed. For example, in the display area of the display 250, the inactive portion may include a border of an opening, or may surround the border of the opening. As an example, the camera 210 may be an example of a UDC. The inactive portion may refer, for example, to a partial portion of the display area of the display including a diode (e.g., OLED) controlled by the electronic device 101 to operate the UDC.

According to an embodiment, the electronic device 101 may adjust a size of the active portion of the display based on intensity of light. For example, while the electronic device 101 enlarges an extent of the active portion, the extent of the inactive portion may be reduced. For example, while adjusting the extent of the active portion of the display, the electronic device 101 may adjust the inactive portion. The electronic device 101 may change the portion of the pixels included in the display 250 into an inactive state in order to adjust the extent of the active portion. An operation for adjusting the extent of the display area of the display will be described in greater detail below with reference to FIG. 4.

As the inactive portion is enlarged, intensity of display light 320 directed to the camera 210 may decrease since distance between the pixels activated in the display 250 and the camera 210 increases. As the inactive portion decreases, intensity of the display light 320 may increase since the distance between the activated pixel and the camera 210 decreases. According to an embodiment, the electronic device 101 may adjust intensity of display light 320 included in light received by the camera 210 by adjusting the size of the inactive portion. The electronic device 101 may adjust brightness (or luminance) of the display based on intensity of light received from an illuminance sensor. As an example, the electronic device 101 may change brightness of the display based on a user input. As an example, the electronic device 101 may adjust the display light 320 based on light emitted from the active portion of the display.

According to an embodiment, the electronic device 101 may enlarge the active portion while maintaining the size and/or extent of at least the portion in which the active portion and the inactive portion are displayed in the display area of the display. Since the size and/or extent of the at least portion is maintained, enlarging the active portion by the electronic device 101 may cause a reduction in the inactive portion.

According to an embodiment, the reflected light 330 may include light generated by reflecting light emitted from the display 250 to at least one reflector 331 around the electronic device 101. At least one reflector 331 may include a person and/or an object. For example, the reflected light 330 may include light which is light emitted from the display 250 is reflected by at least one reflector 331. The reflected light 330 may be an example of indirect light.

Light reflected from the reflector 331, including the reflected light 330, may be propagated in various direction according to the surrounding environment. For example, the surrounding environment may include at least one of rain, water vapor, fine dust, and/or fog. According to an embodiment, the electronic device 101 may identify a change of intensity of reflected light 330 due to the surrounding environment. However, the disclosure is not limited thereto.

According to an embodiment, the electronic device 101 may receive at least one of ambient light 310, display light 320, and/or reflected light 330 comprehensively through the camera 210 and/or the illuminance sensor. For example, the electronic device 101 may identify intensity of ambient light 310, display light 320, and reflected light 330 through the camera 210 and/or an illuminance sensor. When intensity of light (e.g., a combination of ambient light 310, display light 320, and reflective light 330) directed to the camera 210 exceeds preset intensity, the electronic device 101 may adjust intensity of light emitted through the display 250 to prevent and/or reduce the scattering of light generated by the light from distorting the image captured using the camera 210. Distortion of the image may include an image blur phenomenon received through the camera 210. For example, in case that intensity of ambient light is constant, distortion of the image may be caused by at least one of reflected light 330 or display light 320 that is related to light emitted from the display and transmitted to the camera 210.

According to an embodiment, the electronic device 101 may receive light (e.g., a combination of ambient light 310, display light 320, and reflective light 330) through the camera 210 and/or an illuminance sensor (e.g., an illuminance sensor 231 of FIG. 2), and adjust brightness of the display 250 based on intensity of the light. For example, the electronic device may adjust brightness of the display 250 to process (or prevent/reduce) the scattering of light in case that intensity of received light (e.g., the combination of ambient light 310, display light 320, and reflective light 330) exceeds preset intensity through the camera 210 and/or the illuminance sensor.

Although not illustrated, according to an embodiment, the electronic device 101 may change at least one pixel from the active state to a different state in the display area of the display based on intensity of light (e.g., a combination of ambient light 310, display light 320, and reflective light 330). For example, the electronic device 101 may change at least one pixel into the inactive state in the display area of the display based on receiving a shooting input. The electronic device 101 may adjust the extent of the inactive portion in which pixels are changed into inactive state in the display area of the display based on intensity of light (e.g., a combination of ambient light 310, display light 320, and reflective light 330) received through the camera 210 and/or an illuminance sensor. As an example, the electronic device 101 may treat the scattering of light by increasing the extent of the inactive portion in case that intensity of light (e.g., a combination of ambient light 310, display light 320, and reflective light 330) received through the camera 210 and/or the illuminance sensor exceeds preset intensity.

Figure 4:
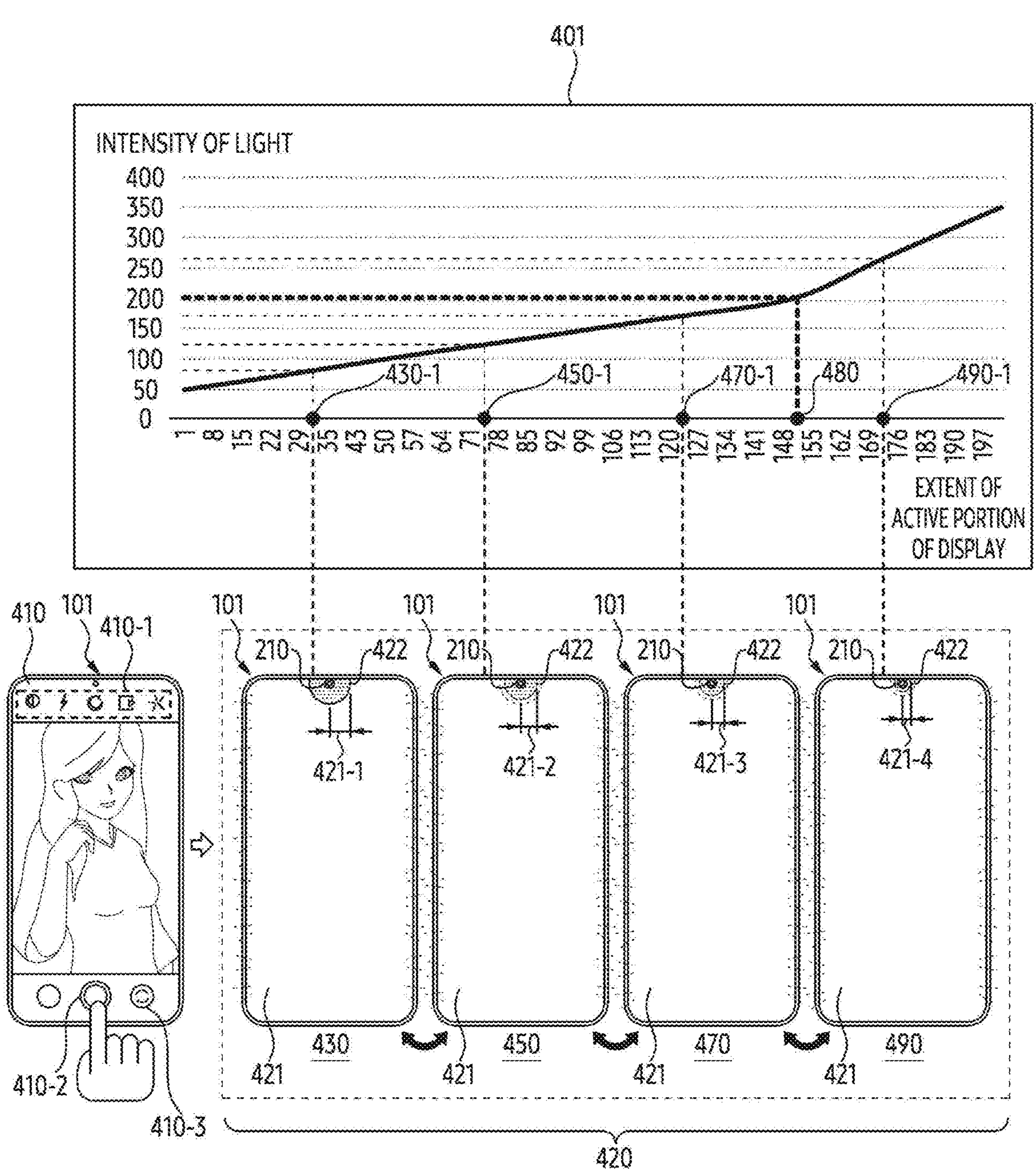
FIG. 4 is a diagram illustrating an example operation in which an electronic device adjusts an active portion of a display according to intensity of light emitted from a portion having a preset color in a display according to various embodiments.

FIG. 4 is a diagram illustrating an example operation in which an electronic device 101 adjusts an active portion of a display according to intensity of light emitted from a portion having a preset color in a display according to various embodiments.

Referring to FIG. 4, according to an embodiment, the graph 401 may represent intensity of light measured using a camera while the electronic device 101 adjusts a size of a portion formed by activated pixels in the display. The portion formed by the activated pixels in the display may be referred to as the active portion of the display. For example, the display may include a display 250 of FIG. 2. The active portion of the display may refer, for example, to a portion that emits light based on an active state of at least one pixel included in a displayed second screen 420 in response to receiving a shooting input. The active portion of the display included in the second screen 420 may include a first portion 421. A camera 210 may include a camera 210 of FIG. 2.

In an embodiment, the electronic device 101 may form an active portion in the display by applying a voltage and/or current to one or more pixels included in the display. At least a portion of light emitted from the formed active portion may propagate to the camera 210 of the electronic device 101 such as reflected light 330 and/or display light 320 of FIG. 3. An inactive portion of the display may include a portion in the display formed by other pixels, different from one or more pixels emitting light by the active portion among the pixels of the display. In the inactive portion, hardware (e.g., black matrix, and/or UDC) formed under the pixels may be viewable. According to an embodiment, the electronic device 101 may identify a scattering included in an image obtained by the camera 210 by light emitted from the active portion based on light received by the camera 210.

In an embodiment, intensity of light measured by the electronic device 101 may be intensity in which light of FIG. 3 (e.g., a combination of ambient light 310, display light 320, and reflected light 330) received to the electronic device through the camera 210 is combined. For example, referring to the graph 401, in case that an extent of the active portion of the display is 0, intensity of light may include intensity of ambient light (e.g., ambient light 310 of FIG. 3). The electronic device 101 may identify intensity of ambient light existing in the surrounding environment of the electronic device. In case that the extent of the active portion of the display is less than or equal to critical point 480, intensity of light may include intensity of ambient light and reflected light (e.g., reflected light 330 of FIG. 3). Referring to the graph 401 of FIG. 4, in case that the extent of the active portion of the display exceeds the critical point 480, intensity of light may refer, for example, to intensity of light combined with ambient light 310, reflected light 330, and light emitted from the display 250 and received directly to the camera (e.g., display light 320 in FIG. 3).

According to an embodiment, the electronic device 101 may identify intensity of at least one of a plurality of light, through the camera 210. As another example, the electronic device 101 may identify intensity of light in which a plurality of light is combined. At least a portion of the camera 210 may be placed by overlapping a portion of the display. A first screen 410 and the second screen 420 may be one example of a screen displayed on the display included in the electronic device 101 of FIG. 2. The first portion 421 and/or the second portion 422 may be included in the display. As an example, the first portion 421 and/or the second portion 422 may be included in the second screen 420.

The electronic device 101 according to an embodiment may change from the first screen 410 to the second screen 420 based on receiving the shooting input of a user using a processor (e.g., a processor 120 of FIG. 2) included in the electronic device. The first screen 410 may include the image (e.g., a preview image) received through the camera 210 and/or a UI related to the camera 210. The shooting input may include a user input for obtaining the image received from the camera 210. For example, the user input may include a gesture of touching (e.g., tap) and/or clicking at least one icon displayed by the electronic device 101. The user input may include the gesture of touching a visual object, such as a shutter 410-2 provided in the form of the at least one icon. For example, the shooting input may include the gesture of pressing a preset button among one or more buttons exposed to outside through a housing of the electronic device 101. As an example, the electronic device 101 may identify a preset pose of at least one object included in the image received through the camera 210 as the shooting input. The preset pose may be a predetermined pose by the user input before the shooting input. After identifying the user input, the electronic device 101 may obtain the image received through the camera 210 in response to receiving the shooting input.

According to an embodiment, the electronic device 101 may receive a signal corresponding to the user input of touching and/or clicking at least one icon (e.g., a camera application) related to the camera 210 included in an operating system, based on the operating system stored in a memory (e.g., a memory 130 of FIG. 2) and/or a processor (e.g., a processor 120 of FIG. 2). In response to receiving the signal, the electronic device 101 may change the camera from an inactive state to an active state by operating the camera 210. The electronic device 101 may display a portion of a User Interface (UI) related to the camera 210 on the display 250 in the active state of the camera. For example, a screen (e.g., the first screen 410) displayed by the electronic device 101 on the display 250 may include activity. The electronic device 101 may display a preview image received through the camera 210 on the electronic device 101 in the screen.

According to an embodiment, the electronic device 101 may display visual objects 410-1 for performing different functions related to the camera 210 included in the electronic device 101 while displaying the preview image in the screen. The first screen 410 may include the visual objects 410-1. The visual objects 410-1 may include one or more parameters to be used to control the camera 210. For example, the one or more parameters may include a setting, resolution, a mode of flash light, and/or a magnification of the camera 210. As an example, the electronic device 101 may receive the user input for touching and/or clicking the visual object related to the mode of the flash light. In response to receiving the user input, the electronic device 101 may change the mode of the flash light from the inactive state to the active state. The electronic device 101 receiving the user input may display the second screen 420 in response to receiving the shooting input. Brightness of the second screen 420 may be set independently of brightness of the preview image. The second screen 420 may include an output related to the mode of flash light. In case that the mode of flash light is in the active state, the electronic device 101 may change at least one pixel included in the active portion of the display to the active state in response to receiving the shooting input. For example, the electronic device 101 may identify intensity of light in response to receiving the shooting input, independently of receiving the user input, and operate flash light based on the identified intensity of light. The light may refer, for example, to intensity of ambient light 310 of FIG. 3.

According to an embodiment, the electronic device 101 may include another camera (not illustrated) that is exposed at least partially to outside through a different surface faced away a surface to which the display is attached. The other camera may include one or more LEDs that emit light. The electronic device 101 may receive the user input for touching and/or clicking a visual object 410-3 related to camera changing to operate the other camera in the active state of the camera 210. The electronic device 101 may interchange the active state of the camera 210 and/or the other camera in response to the user input. For example, in case that the other camera is the active state, the electronic device 101 may display the image received from the other camera in the display. The electronic device 101 may activate the one or more LEDs in a state of displaying the image received from the other camera based on receiving the shooting input. The electronic device 101 may obtain the image corresponding to the shooting input independently of displaying the second screen 420 using the activated one or more LEDs.

According to an embodiment, the second screen 420 may include the first portion 421 including the active portion of the display and the second portion 422 including an opening. For example, the second screen 420 may include the first portion 421 other than the second portion 422 in the display area of the display. As an example, the display area of the display may be divided into the first portion 421 and/or the second portion 422. For another example, the display area of the display may include another portion other than the first portion 421 and/or the second portion 422.

According to an embodiment, the electronic device 101 may enlarge the first portion 421 while maintaining the size and/or the extent of at least a portion in which the first portion 421 and the second portion 422 are displayed in the display area of the display. Since the size and/or extent of the at least a portion is maintained, changing the first portion 421 by the electronic device 101 may cause a change in the second portion.

According to an embodiment, the electronic device 101 may display the first portion 421 in white (or white) by controlling pixels included in the display. The electronic device 101 may display black (or black) to display the second portion 422 by controlling pixels included in the display. For example, the electronic device 101 may change pixels corresponding to the second portion to the inactive state in order to display the second portion 422. An embodiment in which a shape of the second area 422 is circle is illustrated in FIG. 4, but the disclosure is not limited thereto. As an example, the shape of the second portion 422 may be any one of a circle, an ellipse, a square, and a polygon. An example of the second portion 422 having the shape different from that of the circle will be described in greater detail below with reference to FIG. 5.

According to an embodiment, the electronic device 101 may display brightness of the second screen 420 displayed in the display independently of the brightness of the first screen 410. For example, brightness of the second screen 420 may exceed brightness of the first screen 410. As an example, the electronic device 101 may maximize brightness of the second screen 420. Brightness of the display may vary according to a specification of the electronic device 101. The electronic device 101 according to an embodiment may identify intensity of received light through at least one sensor included in the electronic device. For example, at least one sensor may include an illuminance sensor 231 of FIG. 2.

According to an embodiment, the electronic device 101 may change the shape and/or the extent of the active portion in the second screen 420 as in states 430, 450, 470, and 490 between a first time point at which the shooting input is received and a second time point at which the image is captured using the camera 210. Based on the changed active portion, the electronic device 101 may obtain a relationship between light output from the display through the active portion and light received by the camera 210.

According to an embodiment, the electronic device 101 may display the second screen 420 in response to receiving the shooting input while displaying the first screen 410. For example, the electronic device 101 may display the second screen 420 corresponding to the states 430, 450, 470, and 490 repeatedly or alternately with the first screen 410. As an example, the electronic device 101 may output the second screen 420 corresponding to the first state 430, and output the first screen 410 after a preset period from the time point when the second screen 420 corresponding to the first state 430 is output. The electronic device 101 may output the second screen 420 corresponding to the second state 450, and output the first screen 410 after a preset period from the time point when the second screen 420 is output. While the second screen 420 is repeatedly displayed, the electronic device 101 may display the extent of the first portion 421 corresponding to the states 430, 450, 470, and 490. The electronic device 101 may identify intensity of light in states 430, 450, 470, and 490 corresponding to the points 430-1, 450-1, 470-1, and 490-1.

According to an embodiment, identifying the intensity of light by the electronic device 101 may be performed based on a shader and/or a graphics pipeline executed by a graphic processor (e.g., a graphic processor 270 of FIG. 2). For example, based on the execution of the shader, the graphic processor may obtain a sum of numerical values representing colors of one or more pixels included in the image received from the camera 210. Based on the obtained sum, the electronic device 101 may identify the intensity of the light received by the camera 210 at a time point (e.g., a time point at which the second screen 420 is displayed in any one of the first state 430 to the fourth state 490) at which the image is captured.

For example, although not illustrated, the number of points may be further added. The critical point 480 and/or the number of points may be predetermined to a number suitable for the electronic device 101 to measure the change of intensity of light measured by the camera 210 by adjusting the first portion 421 in the second screen 420.

According to an embodiment, the electronic device 101 may display the second screen 420 in response to the shooting input while displaying the first screen 410. For example, the electronic device 101 may discretely display the second screen 420 corresponding to the states 430, 450, 470, and 490. As an example, the electronic device 101 may adjust brightness of the display before displaying the second screen 420 corresponding to the second state 450 in the first state 430. Brightness of the display may be related to intensity (or amplitude) of light emitted from the pixel, independently of the color of the pixel. As an example, the electronic device 101 may adjust brightness of the display before displaying the second screen 420 corresponding to the third state 470 in the second state 450. The electronic device 101 may adjust brightness of the display before displaying the second screen 420 corresponding to the fourth state 490 in the third state 470. For example, the electronic device 101 may maximize brightness of the display while displaying the second screen 420 corresponding to the states 430, 450, 470, and 490. By repeatedly adjusting brightness of the second screen 420, the electronic device 101 may remove a red eye effect (or red eye) of an object received through the camera 210 according to the light emitted by the first portion 421.

According to an embodiment, the electronic device 101 may output the second screen 420 by overlapping the first screen 410 in response to the shooting input while displaying the first screen 410. The electronic device 101 may continuously display the second screen 420 corresponding to the states 430, 450, 470, and 490. For example, the electronic device 101 may gradually increase the extent of the first portion 421. For example, the electronic device 101 may gradually reduce the extent of the second portion 422.

While displaying the second screen 420, according to an embodiment, the electronic device 101 may adjust the size of the first portion 421 and/or the second portion 422 such as states 430, 450, 470, and 490. For example, while displaying the second screen 420, the electronic device 101 may adjust the extent of the first portion 421 in the second screen 420 based on the processor (e.g., the processor 120 of FIG. 2). As an example, the electronic device 101 may continuously expand the extent of the first portion 421 while identifying intensity of light through the camera 210.

According to an embodiment, the electronic device 101 may overlap the second screen 420 on the first screen 410 and display the same on the display in response to receiving the shooting input. In the first state 430, the electronic device 101 may display the extent of the second portion 422 included in the second screen 420 as a preset extent. For example, the preset extent may be the extent stored based on a shooting before the user input and/or the shooting input.

According to an embodiment, the electronic device 101 may identify intensity of light and adjust the extent of the second portion 422 in the first state 430. For example, in the first state 430, the electronic device 101 may identify intensity of light as less than 100 in case that the extent (e.g., the first portion 421) of the active portion of the display corresponds to the first point 430-1. In case that the identified intensity of light is less than intensity of light corresponding to the critical point 480, the electronic device 101 may reduce the extent of the second portion 422. For example, in the second state 450, the extent of the second portion 422 may be smaller than the extent of the second portion 422 in the first state 430. As an example, in the second state 450, a radius 421-2 of the second portion 422 may be smaller than a radius 421-1 of the second portion 422 in the first state 430.

According to an embodiment, the electronic device 101 may identify intensity of light based on the extent of the active portion of the display in the second state 450. The electronic device 101 may adjust the extent of the second portion 422 based on the intensity of light. In the second state 450, in case that intensity of light corresponding to the second point 450-1 is less than intensity of light corresponding to the critical point 480, the electronic device 101 may reduce the extent of the second portion 422. For example, in the third state 470, the extent of the second portion 422 may be smaller than the extent of the second portion 422 in the second state 450. As an example, in the third state 470, a radius 421-3 may be less than the radius 421-2 in the second state 450. For another example, the electronic device 101 may adjust the extent of the first portion 421 in the third state 470 to be larger than the extent of the first portion 421 in the second state 470.

According to an embodiment, the electronic device 101 may identify intensity of light based on the active portion (e.g., the first portion 421) of the display, including the adjusted second portion 422 in the fourth state 490. The amount of change (or slope) of intensity of light received by the electronic device 101 may be the same at the first point 430-1, the second point 450-1, and the third point 470-1. For example, the electronic device 101 may differently identify the amount of change of intensity of light identified at points 430-1, 450-1, and 470-1 before the critical point 480, and the amount of change of intensity of light identified at the fourth point 490-1. As an example, while receiving intensity of light corresponding to the fourth point 490-1, the electronic device 101 may identify the amount of change of intensity of light increased than the amount of change of intensity of light identified at the points 430-1, 450-1, and 470-1 before the critical point 480. The increased amount of change may be caused by display light (e.g., display light 320 of FIG. 2). While receiving intensity of light corresponding to the fourth point 490-1, the electronic device 101 may identify the scattering of light by the display light based on identifying the increased amount of change. For example, the electronic device 101 may adjust the extent of the first portion 421 to compensate for the scattering of the generated light.

According to an embodiment, the electronic device 101 may identify intensity of light based on the first portion 421 in the fourth state 490. For example, intensity of light corresponding to the fourth point 490-1 may exceed intensity of light corresponding to the critical point 480. As an example, the amount of change of intensity of light identified at the fourth point 490-1 may be greater than the amount of change of intensity of light identified at the third point 470-1.

In the fourth state 490, in case that identified intensity of light exceeds intensity of light corresponding to the critical point 480, the electronic device 101 may change from the fourth state 490 to another state (e.g., the third state 470) different from the fourth state 490 so that the intensity of light decreases based on the reduction of the extent of the first portion 421.

In the fourth state 490, in case that identified intensity of light exceeds intensity of light corresponding to the critical point 480, the electronic device 101 may change from the fourth state 490 to another state (e.g., the third state 470) different from the fourth state 490. The other state may include a state in which the extent of the first portion 421 is reduced so that the intensity of light is less than the intensity of light identified in the fourth state 490.

According to an embodiment, the electronic device 101 may expand the extent of the second portion 422 in case that identified intensity of light exceeds intensity of light corresponding to the critical point 480 in the fourth state 490. For example, the electronic device 101 may change the extent of the second portion 422 in the fourth state 490 to be the same as the extent of the second portion 422 in the third state 470. As an example, the electronic device 101 may change a radius 421-4 of the second portion 422 in the fourth state 490 to the same as the radius 421-3 of the second portion 422 in the third state 470. As an example, in the fourth state 490, in case that identified intensity of light exceeds intensity of light corresponding to the critical point 480, the electronic device 101 may display the second screen 420 corresponding to the third state 470 on the display.

According to an embodiment, the electronic device 101 may obtain the image corresponding to the shooting input while displaying the second screen 420 including the first portion 421 adjusted based on intensity of light. The electronic device 101 may obtain the image corresponding to the shooting input and store the extent of the first portion 421 and/or the second portion 422 displayed on the second screen 420 in the processor (e.g., a processor 120 of FIG. 2). For example, a stored extent of the first portion 421 and/or the second portion 422 may be the extent adjusted in the fourth state 490. As an example, the extent of the first portion 421 and/or the second portion 422 adjusted in the fourth state 490 may be the same as the extent of the first portion 421 and/or the second portion 422 in the third state 470.

Figure 5:
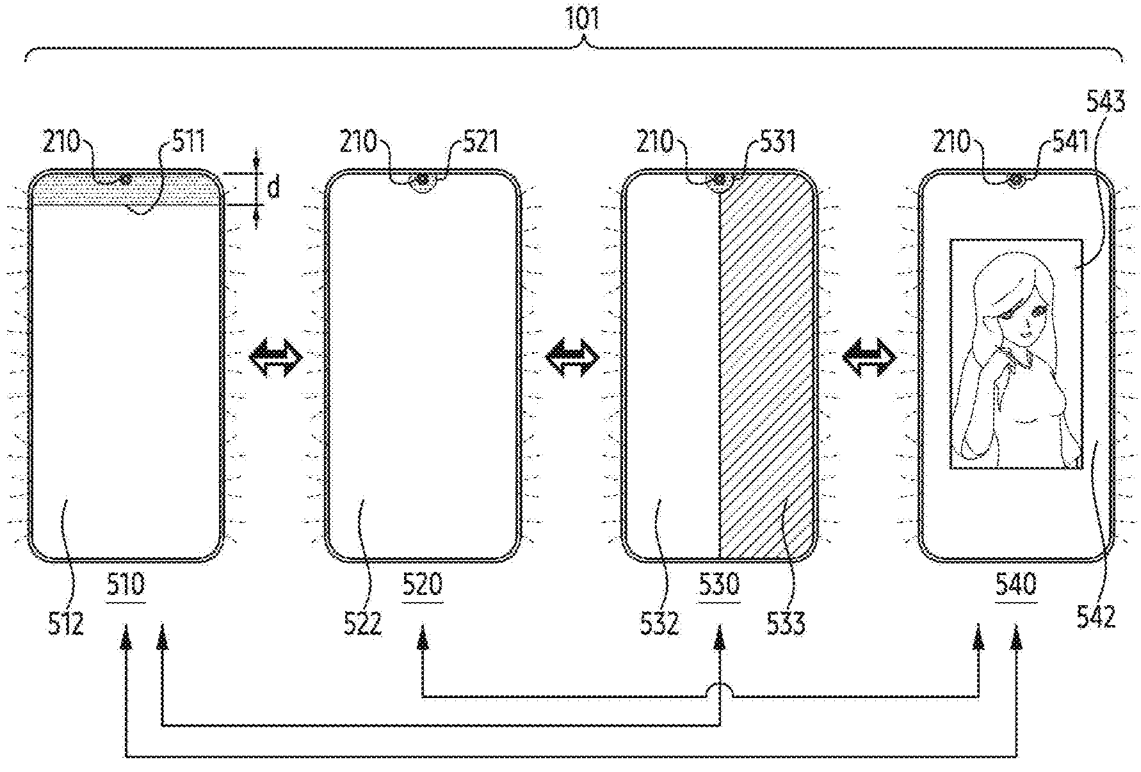
FIG. 5 is a diagram illustrating an example operation in which an electronic device displays an active portion of a display in response to receiving a shooting input according to various embodiments.

As described above, the electronic device 101 may adjust intensity of light emitted from the display based on the states 430, 450, 470, and 490. The electronic device 101 may identify the change of intensity of light received through the camera 210, adjusting intensity of light emitted from the display. Based on the change of intensity of light, the electronic device 101 may obtain the image by controlling the camera 210 in a state in which intensity of light received through the camera 210 is maximized as the scattering of light is compensated among the states 430, 450, 470, and 490. In FIG. 5, various embodiment for the electronic device to display the first portion 421 and/or the second portion 422 will be described in greater detail below.

FIG. 5 is a diagram illustrating an example operation in which an electronic device 101 displays an active portion of a display in response to receiving a shooting input according to various embodiments.

The electronic device 101 according to an embodiment of FIG. 5 may be an example of the electronic device 101 of FIG. 1 to FIG. 2. States 510, 520, 530, and 540 may be an example of a second screen 420 of FIG. 4. For example, the electronic device 101 may interchange the states 510, 520, 530, and 540 in response to a user input. A camera 210 may correspond to an example of a camera 210 of FIG. 2. The first portions 512, 522, 532, and 542 may be an example of a first portion 421 of FIG. 4. For example, the third portion 533 may be included in the first portion 421 of FIG. 4. The second portions 511, 521, 531, and 541 may be an example of a second portion 422 of FIG. 4. For example, the second portions 511, 521, 531, and 541 may include at least a portion of the camera 210 placed to overlap the display area on the display. A preview image 543 may be a preview image included in a first screen 410 of FIG. 4.

According to an embodiment, the electronic device 101 may overlap and display the second screen 420 of the first state 510 on the display in response to the shooting input while displaying the first screen 410 of FIG. 4. Referring to FIG. 5, in the first state 510, the electronic device 101 may represent the second portion 511 in a polygonal shape including at least a portion of the camera 210 in the display area of the display. For example, the second portion 511 may include a U-shape. The electronic device 101 may adjust an extent of the second portion 511 based on the operation according to the states 430, 450, 470, and 490 of FIG. 4. The electronic device 101 may change the extent of the second portion 521 by adjusting d. For example, the electronic device 101 may change a length of d based on intensity of light received through the camera in the first state 510. As an example, the electronic device 101 may adjust the length of d based on intensity of light emitted from the active portion (e.g., a first portion 421 of FIG. 4) of the display. As an example, the electronic device 101 may increase a size of the active portion of the display by reducing the length of d based on intensity of light received through the camera.

According to an embodiment, the electronic device 101 may reduce the second portion 511, maintaining the extent of at least the portion in which the active portion and the second portion 511 are displayed in the display area of the display. Since the extent of the at least portion is maintained, reducing the second portion 511 by the electronic device 101 may cause an enlargement of the active portion.

According to an embodiment, the electronic device 101 may overlap and display the second state 520 on the display in response to the shooting input while displaying the first screen 410 of FIG. 4. The second portion 521 including at least the portion of the camera 210 may have the same shape as an opening formed in the display. Although not illustrated, as an example, the shape of the second portion 521 may be any one of a circle, an ellipse, a square, and a polygon. The electronic device 101 may adjust the extent of the second portion 521 based on changing between the states 430, 450, 470, and 490 of FIG. 4. The electronic device 101 may change the shape of the second portion 521 based on the operation.

According to an embodiment, the electronic device 101 may overlap and display the third state 530 on the display in response to the shooting input while displaying the preview image (e.g., the first screen 410 of FIG. 4). The display area of the display may be divided into the first portion 532, the second portion 531, and/or the third portion 533 including at least the portion of the camera. For example, the second portion 531 may be an example of the second portion 511 of the first state 510 or the second portion 521 of the second state 520. The third portion 533 may include at least the portion of the display area except for the second portion 531 in the display area of the display. For example, the electronic device 101 may display the third portion 533 and the first portion 532 symmetrically. As an example, although not illustrated, the electronic device 101 may display the third portion 533 and the first portion 532 vertically symmetrically. For another example, the electronic device 101 may display the third portion 533, the first portion 532, and/or the second portion 531 in a grid pattern. However, the disclosure is not limited.

According to an embodiment, the electronic device 101 may set a color of the third portion 533 in the third state. For example, the color of the third portion 533 may be another color (e.g., red) different from the color (e.g., white) of the first portion 531. For example, while displaying the image (e.g., the first screen 410 of FIG. 4) in the active state of the camera, the electronic device 101 may overlap and output the third state 530 on the display in response to the shooting input, and obtain the image corresponding to the shooting input.

According to an embodiment, the electronic device 101 may display the fourth state 540 in the display before receiving the shooting input in the active state of the camera. For example, the first portion 542 may include at least the portion of the active portion of the display whose brightness is independently controlled by the electronic device. As an example, in response to receiving the shooting input, the electronic device 101 may set brightness of the first portion 542 to exceed brightness of the preview image 543. As an example, the electronic device 101 may maximize brightness of the first portion 542. The second portion 541 may be an example of the second portion 511 of the first state 510. The second portion 541 may be an example of the second portion 521 of the second state 520. The electronic device 101 may display the first portion 542 and the preview image 543 in the portion other than the second portion 541 in the display area of the display. The preview image 543 may be included in at least the portion of the first screen 410 of FIG. 4. For example, the first portion 542 may surround a border of the preview image 543 in the display area of the display.

According to an embodiment, the electronic device 101 may change the extent of the second portion 541 in the fourth state 540, based on the operation according to the states 430, 450, 470, and 490 of FIG. 4. For example, the electronic device 101 may adjust the extent of the first portion 542, the second portion 541, and/or the preview image 543. As an example, the extent of the preview image 543 may be smaller than the extent of the first portion 542. The electronic device 101 may adjust the size of the first portion 542, the second portion 541, and/or the preview image 543 based on intensity of light, and obtain the image in response to the shooting input. The obtained image may include at least the portion of the preview image 543.

According to an embodiment, the electronic device 101 may adjust brightness (or luminance) of the first portion 512, 522, 532, and 542 included in the states 510, 520, 530, and 540. For example, in case (e.g., a fourth point 490 of FIG. 4) that intensity of light received by the electronic device 101 exceeds intensity of light corresponding to a critical point (e.g., a critical point 480 of FIG. 4), the electronic device 101 may compensate for the scattering of light by reducing brightness of the first portions 512, 522, 532, and 542 in states 510, 530, and 540.

As described above, the electronic device 101 may adjust the extent, brightness (or luminance) of the first portions 512, 522, 532, and 542, and/or the extent of the second portions 511, 521, 531, and 541 based on intensity of light received through the camera 210 to compensate for distortion of the image. However, the disclosure is not limited.

Figure 6:
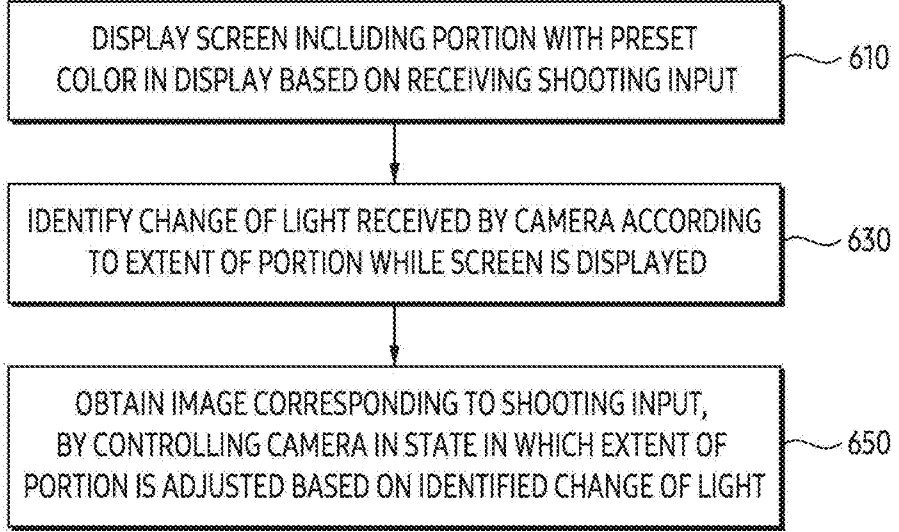
FIG. 6 is a flowchart illustrating an example operation in which an electronic device adjusts an active portion of a display in response to receiving a shooting input according to various embodiments.

FIG. 6 is a flowchart illustrating an example operation in which an electronic device adjusts an active portion of a display in response to receiving a shooting input according to various embodiments.

The electronic device of FIG. 6 may be an example of the electronic device 101 of FIG. 1. For example, the operation of FIG. 6 may be performed by the electronic device 101 of FIG. 1 and/or a processor 110 of FIG. 1.

Referring to FIG. 6, in an operation 610, the electronic device according to an embodiment may display a screen including a portion with a preset color in the display, based on receiving the shooting input. For example, the display may correspond to the display 250 of FIG. 2. The portion with the preset color may be referred to a first portion 421 of FIG. 4. The preset color may include white. The screen may include a second screen 420 of FIG. 4.

According to an embodiment, the electronic device may include another portion including an opening formed in the display area of the display, which is different from the portion with a preset color. The other portion may be black. The shooting input may be an example of a user input for obtaining an image.

According to an embodiment, the electronic device may display the image (e.g., a first screen 410 of FIG. 4) received through a camera (e.g., a camera 210 of FIG. 2) in the display before receiving the shooting input.

According to an embodiment, the electronic device may include the image received through the camera, the portion and/or the other portion in the display area of the display. The electronic device may obtain the image received through the camera in response to the shooting input.

Referring to FIG. 6, in an operation 630, according to an embodiment, the electronic device may identify a change of light received by the camera according to an extent of the portion while the screen is displayed. For example, the change of light received by the camera may be an example of the change of intensity of light according to the active portion of the display in a graph 401 of FIG. 4. The change of intensity of light may occur based on brightness of a plurality of pixels included in the display. The light may include ambient light 310 of FIG. 3, display light 320 of FIG. 3, and/or reflected light 330 of FIG. 3. The camera may include at least one sensor. The electronic device may receive light through the camera and/or the at least one sensor and identify intensity of light.

According to an embodiment, the electronic device may include a camera different from the camera. The different camera may include one or more LED. Based on the active state of another camera, the electronic device may obtain the image using the LED, independently of the screen, in a state displaying a preview image received from the other camera.

Referring to FIG. 6, in an operation 650, according to an embodiment, the electronic device may obtain the image corresponding to the shooting input, by controlling the camera in the state in which the extent of the portion is adjusted based on the identified change of light. For example, the electronic device may adjust, according to intensity of light, based on the extent of the portion, based on the operation according to the states 430, 450, 470, and 490 of FIG. 4. The extent of the adjusted portion may be an example of a second portion 422 of the state (e.g., a third state 470 of FIG. 4) corresponding to a point (e.g., a third point 470-1 of FIG. 4) below a preset critical point (e.g., a critical point 480 of FIG. 4). The image corresponding to the shooting input may be an example of the first screen 410 of FIG. 4. The electronic device may obtain the image corresponding to the shooting input and store the extent of the adjusted portion through the processor. According to an embodiment, the electronic device may output the extent of the adjusted portion to the display based on receiving the shooting input different from the shooting input.

Figure 7:
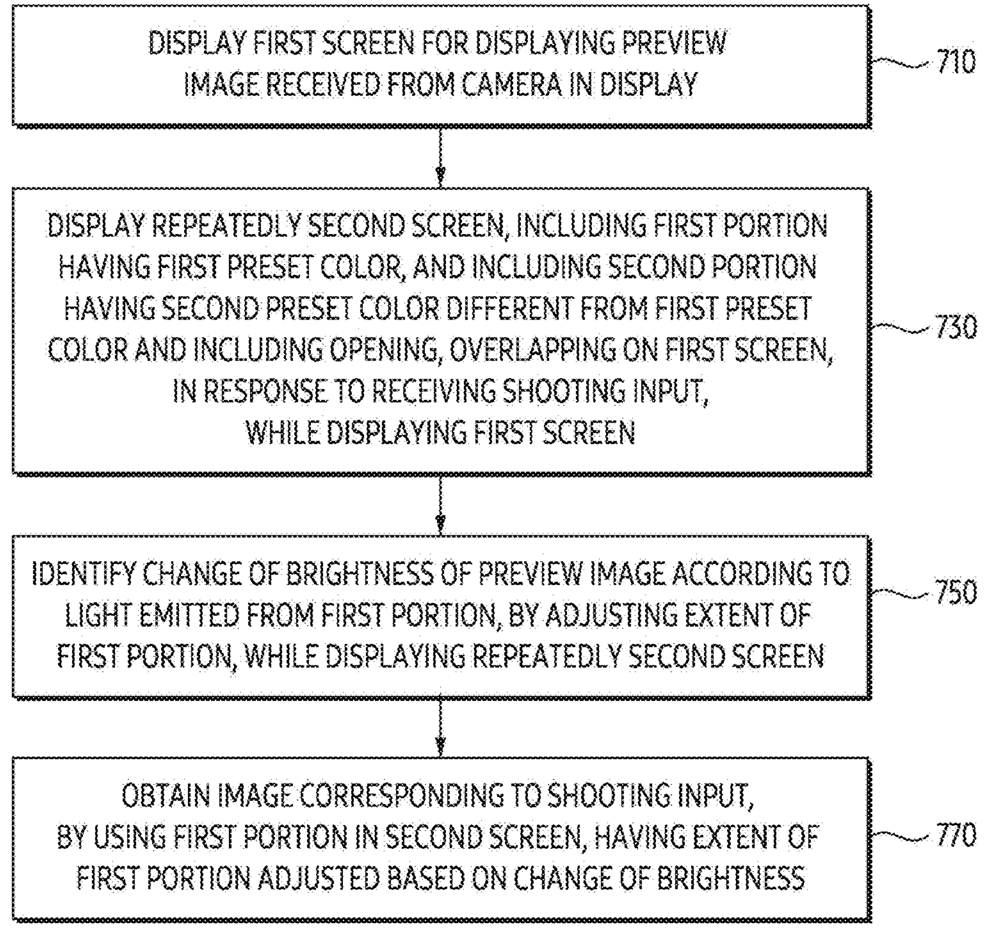
FIG. 7 is a flowchart illustrating an example operation in which an electronic device adjusts an active portion of a display in response to a user input performed in a preview image according to various embodiments.

FIG. 7 is a flowchart illustrating an example operation in which according to an embodiment, an electronic device adjusts an active portion of a display in response to a user input performed in a preview image. The electronic device of FIG. 7 may correspond to the electronic device 101 of FIG. 1. For example, the operation of FIG. 7 may be performed by the electronic device 101 of FIG. 1 and/or a processor 120 of FIG. 1.

Referring to FIG. 7, in an operation 710, the electronic device according to an embodiment may display a first screen for displaying the preview image received from a camera in the display. For example, the display may be referred to a display 250 of FIG. 2. The camera may correspond to a camera 210 of FIG. 2. The first screen may correspond to a first screen 410 of FIG. 4.

Referring to 7, in an operation 730, the electronic device according to an embodiment may display repeatedly a second screen, including a first portion having a first preset color, and including a second portion having a second preset color different from the first preset color and including the opening, overlapping on the first screen, in response to receiving the shooting input, while displaying the first screen. For example, the first portion having the first designated color may be referred to the first portion 421 of FIG. 4.

The electronic device according to an embodiment may control at least one pixel included in the display and display the first preset color in white. However, it is not limited to the above-described embodiment. The second portion having the second preset color may correspond to a second portion 422 of FIG. 4. The second preset color may be displayed in black by at least one pixel included in the display. For example, the electronic device may switch the active state to an inactive state in order to display the at least one pixel in a second designated color. The opening may refer, for example, to the portion overlapping the camera formed in the display. The second screen may refer to the second screen 420 of FIG. 4.

According to an embodiment, the electronic device may adjust the second screen independently of brightness (or luminance) of the first screen. For example, brightness of the second screen may exceed brightness of the first screen. The electronic device may maximize brightness of the second screen. As an example, in the electronic device, brightness of the second screen may refer, for example, to brightness of a maximum value that the electronic device may adjust.

According to an embodiment, the electronic device may set to display repeatedly the second screen, overlapping on the first screen, in response to receiving the shooting input, while displaying the first screen. For example, the electronic device may perform the setting by identifying the user input, and/or intensity of light received from the camera. The intensity of light may refer, for example, to brightness (e.g., ambient light 310 of FIG. 3) of the surrounding environment of the electronic device identified through the camera while the first screen is displayed. For example, the electronic device may include at least one sensor. The electronic device may identify a scattering of light through the sensor. The electronic device may adjust the extent of the first portion, based on the identified the scattering of the light.

According to an embodiment, the electronic device may change the number of repetitions for displaying the second screen. The number of repetitions may refer, for example, to the number of points 430-1, 450-1, 470-1, and 490-1 of FIG. 4. The electronic device may adjust the number of repetitions based on the user input and/or light received through at least one sensor (e.g., a sensor 230 of FIG. 2). The electronic device may identify intensity of light emitted from the first portion (e.g., the first portion 421 of FIG. 4) included in the states (e.g., the first state 430 of FIG. 4, the second state 450 of FIG. 4, the third state 470 of FIG. 4, and the fourth state 490 of FIG. 4) corresponding to the points.

According to FIG. 7, in an operation 750, the electronic device according to an embodiment may identify the change of brightness of the preview image according to light emitted from the first portion, by adjusting the extent of the first portion, while displaying repeatedly the second screen. For example, the electronic device may identify intensity of light emitted from the first portion by adjusting the extent of the second portion 422 of FIG. 4, corresponding to the points 430-1, 450-1, and 470-1 of FIG. 4, based on the operation according to a graph 401 of FIG. 4. The intensity of light may refer, for example, to intensity of light including at least one of ambient light 310 of FIG. 3, display light 320 of FIG. 3, and/or reflected light 330 of FIG. 3.

According to FIG. 7, in an operation 770, the electronic device according to an embodiment may obtain an image corresponding to the shooting input, using the first portion in the second screen, having the extent of the first portion adjusted based on the change of the brightness. The image corresponding to the shooting input may include the first screen 410 of FIG. 4.

For example, the electronic device may use light emitted from the first portion in the second screen. Adjusting the extent of the first portion based on the change of brightness may be referred to adjusting the active portion of the display (e.g., the first portion 421 of FIG. 4) and/or an inactive portion of the display (e.g., the second portion 422 of FIG. 4) based on the states 430, 450, 470, and 490 of FIG. 4. For example, the electronic device may display the second screen, based on other brightness exceeding brightness of the first screen. As an example, the electronic device may maximize brightness of the second screen independently of brightness of the first screen.

For example, the electronic device may receive light reflected by at least one object facing the camera from light emitted from the first portion through the camera. The electronic device may obtain the image corresponding to the shooting input, and store the extent of the first portion and/or the extent of the second portion through the processor. The electronic device may display the stored extent of the first portion and/or the extent of the second portion on the display in response to a shooting input different from the shooting input.

The electronic device according to an embodiment may include a housing. The electronic device may include an actuator for inserting and/or extracting the housing. The electronic device may adjust the housing and the extent of the first portion, by controlling the actuator, in response to receiving the shooting input.

Figure 8A:
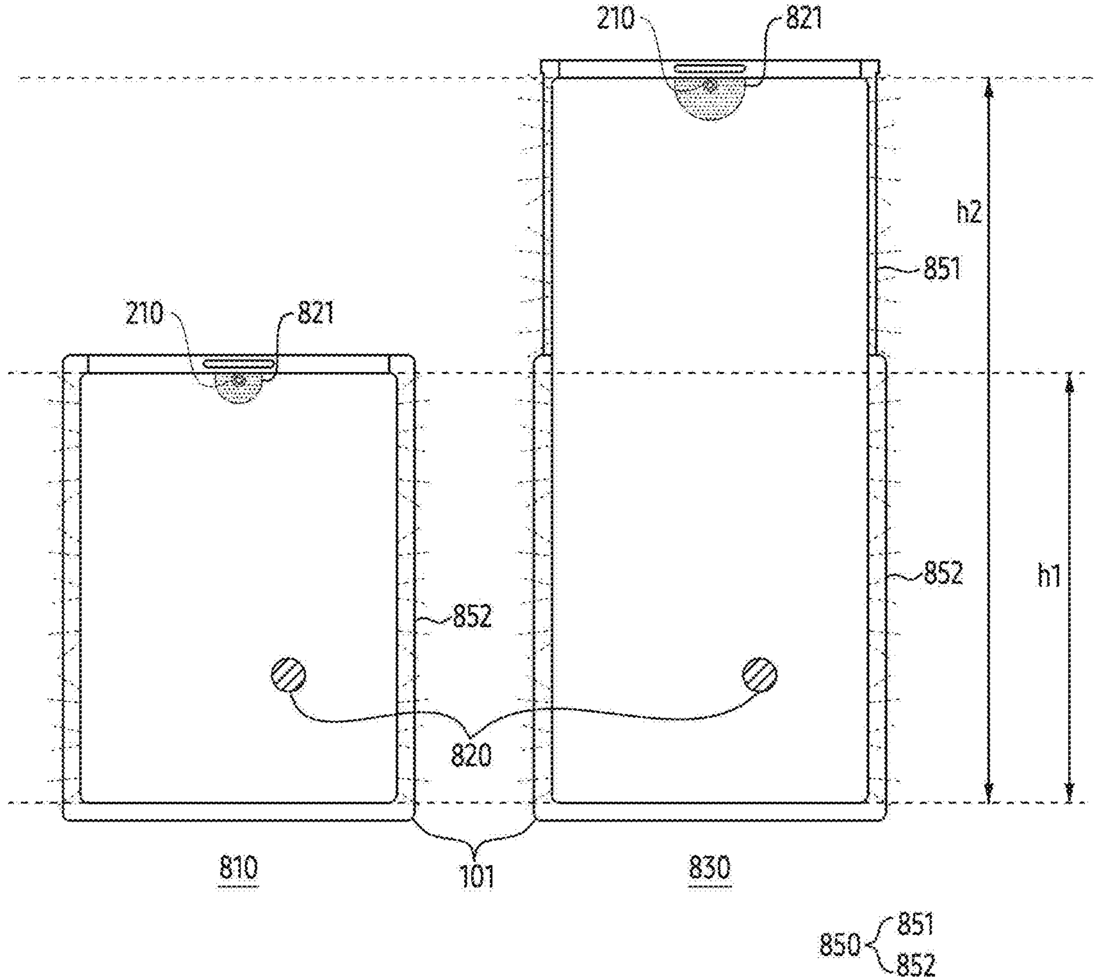
FIGS. 8A to 8B are diagrams illustrating an example operation related to an active portion of a display in case an electronic device is a flexible electronic device according to various embodiments.
Figure 8B:
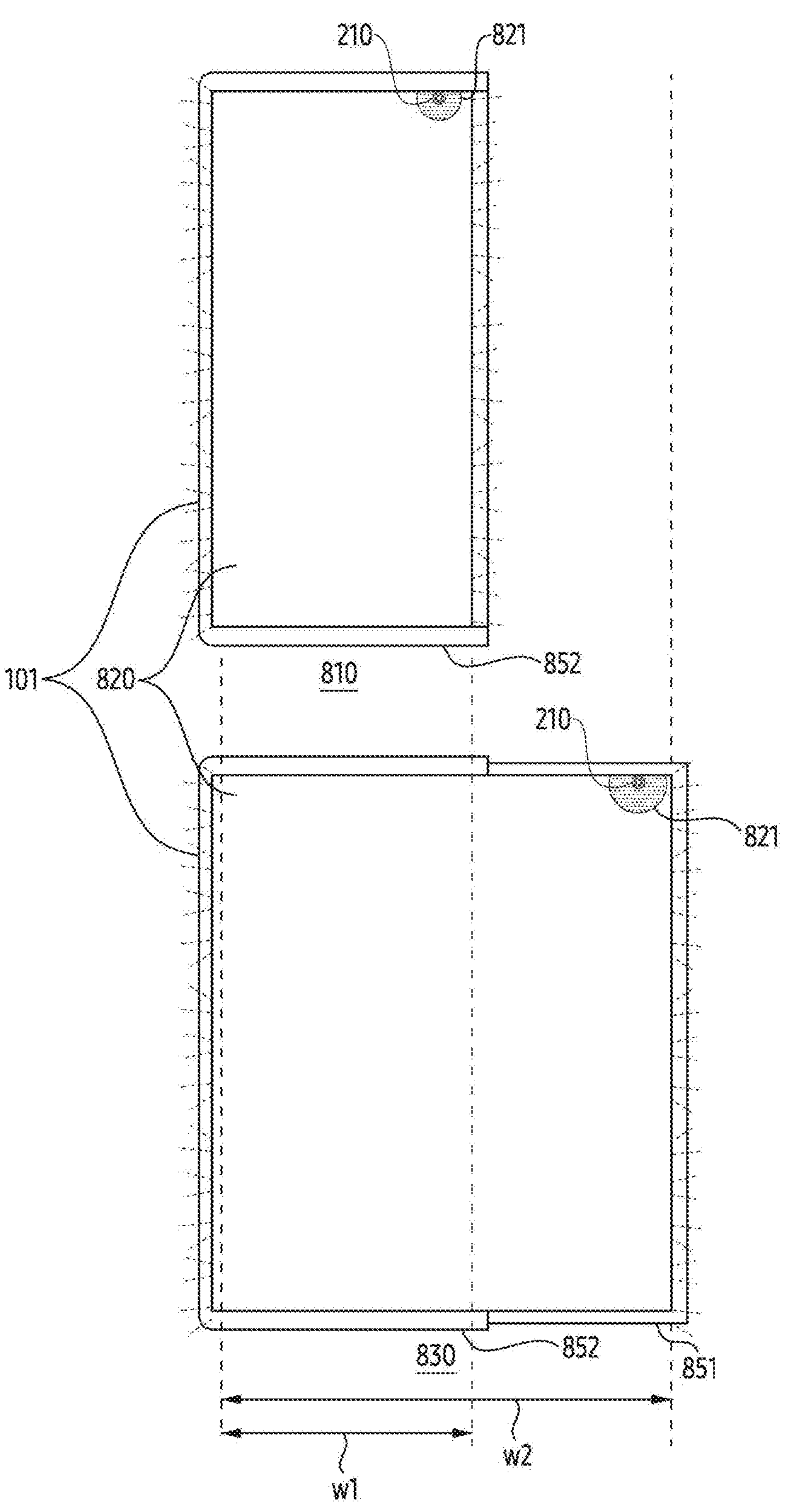

FIGS. 8A and 8B are diagrams illustrating an example operation related to an active portion of a display in case that an electronic device 101 is a flexible electronic device according to various embodiments. The electronic device of FIGS. 8A and 8B may be an example of the electronic device 101 of FIG. 1.

According to an embodiment, the electronic device 101 may have a deformable form factor. Deformation of the electronic device 101 may refer, for example, to at least one of dimensions such as width, height, and/or thickness of the electronic device 101 being changed. At least one of the dimensions may be passively changed by an external force applied to the electronic device 101, and/or may be actively changed by one or more actuators (e.g., a motor) included in the electronic device 101.

According to an embodiment, the electronic device 101 may change a shape of the electronic device 101 by adjusting a positional relationship of a plurality of housings. Referring to FIGS. 8A to 8B, the electronic device 101 according to an embodiment may include a first housing 851 and a second housing 852 (collectively referred to as 850). According to an embodiment, the electronic device 101 may include a flexible display 820 placed on one surface (e.g., a front surface) formed by the first housing 851 and the second housing 852. The flexible display 820 may be related to a display module 160 of FIG. 1. In an embodiment, the first housing 851 and the second housing 852 may be interconnected with each other to deform the flexible display 820 and/or the electronic device 101. Deformation of the electronic device 101 may cause a change of at least one of a breadth, a width, and/or an extent of a portion of the flexible display 820 exposed to outside.

Referring to FIGS. 8A and 8B, an embodiment in which the second housing 852 is slidably coupled with respect to the first housing 851 is illustrated. However, the disclosure is not limited thereto. The flexible display 820 may be insertable into the second housing 852 or extractable from the second housing 852 based on the deformation of the electronic device 101. In case that the flexible display 820 is inserted into the second housing 852, the size of the portion in which the flexible display 820 is exposed to outside may be decreased. In case that the flexible display 820 is extracted from the second housing 852, the size of the portion in which the flexible display 820 is exposed to outside may be increased. A display area of the flexible display 820 may refer, for example, to the portion formed by pixels placed on the portion where the flexible display 820 is exposed to outside among pixels included in the flexible display 820. For example, the display area may refer, for example, to the portion in which pixels included in the flexible display 820 become an active state. For example, the display area may include the active portion of the display (e.g., a first portion 421 of FIG. 4) and/or an inactive portion of the display (e.g., a second portion 422 of FIG. 4).

Referring to FIGS. 8A and 8B, different states 810 and 830 of the electronic device 101 and/or the flexible display 820 are illustrated. According to an embodiment, the electronic device 101 may switch between states 810 and 830 using the actuator such as the motor. Deforming the electronic device 101 between states 810 and 830 using the actuator may be performed to prevent and/or reduce damage (or irreversible deformation of the electronic device 101) of the electronic device 101 due to deformation of the electronic device 101 based on an external force.

In an embodiment, states 810, 830 classified according to the shape of the electronic device 101 may be distinguished according to sizes (e.g., width, height, thickness, and/or an aspect ratio) of the electronic device 101 and/or the flexible display 820. The states 810 and 830 may be distinguished according to a distance between the first housing 851 and the second housing 852 of the electronic device 101. For example, the distance between the first housing 851 and the second housing 852 may be parallel to one surface (e.g., a side surface of the first housing 851) of the first housing 851 and may be the distance between the other surface (e.g., a side surface of the second housing 852) of the second housing 852 spaced apart from the one surface of the first housing 851.

Each of the states 810 and 830 of FIGS. 8A and 8B may be the state in which a surface area of the electronic device 101 and/or the extent of the display area of the flexible display 820 is minimized or maximized as the electronic device 101 is deformed. Hereinafter, as in the state 810, the state in which the surface area of the electronic device 101 and/or the extent of the display area is minimized may be referred to as a slide-in state, a rolled state, a contraction state, and/or a roll-in state. Hereinafter, as in the state 205, a state in which the surface area of the electronic device 101 and/or the extent of the display area is maximized may be referred to as a slide-out state, an unrolled state, an extended state, and/or a roll-out state. In an embodiment, the state of the electronic device 101 may further include another state between the state 810 in which the extent of the display area is minimum and the state 830 in which the extent of the display area is maximum.

Referring to FIGS. 8A and 8B, the flexible display 820 included in the electronic device 101 according to an embodiment may have a rectangular shape. In an embodiment, the corners of the flexible display 820 may have a rounded corner shape. Hereinafter, among the sides that are the boundary of the rectangular flexible display 820, a first direction parallel to the relatively long side may be referred to as a height direction and a relatively long side may be referred to as a height. Hereinafter, among the sides that are the boundary of the rectangular flexible display 820, a second direction parallel to a relatively short side may be referred to as a width direction and a relatively short side may be referred to as the width.

Referring to FIG. 8A, an embodiment in which the electronic device 101 deforms the shape of the electronic device 101 along the height direction among the width direction or the height direction of the flexible display 820 is illustrated. The height h1 of the flexible display 820 in the state 810 of FIG. 8A may be a minimum value of the height of the deformable flexible display 820. The height h2 of the flexible display 820 in the state 810 of FIG. 8A may be the maximum value of the height of the deformable flexible display 820. For example, the height h1 may be the height of the flexible display 820 in the slide-in state, and the height h2 may be the height of the flexible display 820 in the slide-out state.

Referring to FIG. 8B, an embodiment in which the electronic device 101 deforms the shape of the electronic device 101 along the height direction among the width direction or the height direction is illustrated. Each of the width w1 in the state 810 of FIG. 8B and the width w2 in the state 830 may be the minimum and maximum values of the width of the deformable flexible display 820. As the height and/or width of the flexible display 820 is adjusted, the electronic device 101 may change the aspect ratio of the flexible display 820 to the aspect ratio suitable for content output from the electronic device 101. For example, the aspect ratio may be selected from 4.5:3, 16:9, and 21:9.

According to an embodiment, the electronic device 101 may change the shape of the electronic device 101 in response to identifying a preset event. Changing the shape of the electronic device 101 may be performed by activating the actuator such as the motor by the electronic device 101. For example, kinetic energy required to change the shape of the electronic device 101 may be output from a battery included in the electronic device 101 and/or the actuator. Deformation of the electronic device 101 by the kinetic energy may be performed independently of an external force applied to the electronic device 101 by a user.

For example, a preset event for changing the shape of the electronic device 101 may include an operating system running in the electronic device 101 and/or a software interrupt (SWI) generated from an application. The software interrupt may be generated by the application for playing multimedia content (e.g., video) having a specific aspect ratio. For example, the preset event may be generated by a gesture performed on the flexible display 820. The gesture may include at least one of a pinch-to-zoom gesture, a swipe gesture, or a gesture of touching a preset visual object (e.g., an icon with an aspect ratio displayed) displayed on the flexible display 820. For example, the preset event may be generated by a gesture of pressing a button of the electronic device 101.

According to an embodiment, the electronic device 101 may support deformation of the electronic device 101 based on the actuator, independently of the state of an integrated circuit for processing the preset event, such as a processor (e.g., an application processor (AP) and/or a Central Processing Unit (CPU). While a driving of the integrated circuit is at least temporarily stopped, such as a sleep mode and/or a power-off mode, the electronic device 101 may change the shape of the electronic device 101 based on the gesture of pressing the button.

Referring to FIGS. 8A and 8B, the electronic device 101 according to an embodiment may display a screen including a second portion 821 on the flexible display 820 in response to the shooting input based on the states 810 and 830. The second portion 821 may be referred to as the second portion 422 of FIG. 4. In the state 810, the display area of the flexible display excluding the second portion 821 may be referred to as the first portion 422 of FIG. 4. The electronic device 101 may adjust the second portion 821 independently of the operation (e.g., an operation based on the graph 401 of FIG. 4) of adjusting the second portion according to the active portion of the display. For example, in the state 830, the electronic device 101 may set the extent of the second portion 821 to the extent exceeding the extent of the second portion 821 in the state 810. As an example, while changing from the state 810 to the state 830, the electronic device 101 may expand the extent of the second portion 821. While changing the state 830 to the state 810, the electronic device 101 may reduce the extent of the second portion 821.

Referring to FIGS. 8A and 8B, in the state 810, the electronic device 101 according to an embodiment may set the active portion of the flexible display 820 to an extent exceeding the critical point (e.g., a critical point 480 of FIG. 4). For example, as the second portion 821 of the electronic device 101 increases, the active portion of the flexible display 820 decreases, so the light emitted from the flexible display 820 may decrease.

As an example, the electronic device 101 may set the extent of the second portion 821 to the extent corresponding to a point exceeding the critical point (e.g., a fourth point 490-1 in FIG. 4). For another example, in state 810, the electronic device 101 may remove the second portion 821 to obtain an image received through a camera 210 based on the active portion of the display. However, it is not limited to the above-described embodiment. Referring to FIGS. 8A to 8B, in the state 830, an operation for adjusting the second portion 821 of the electronic device 101 may be performed similarly to those of FIGS. 4 to 7 described above.

Figure 9A:
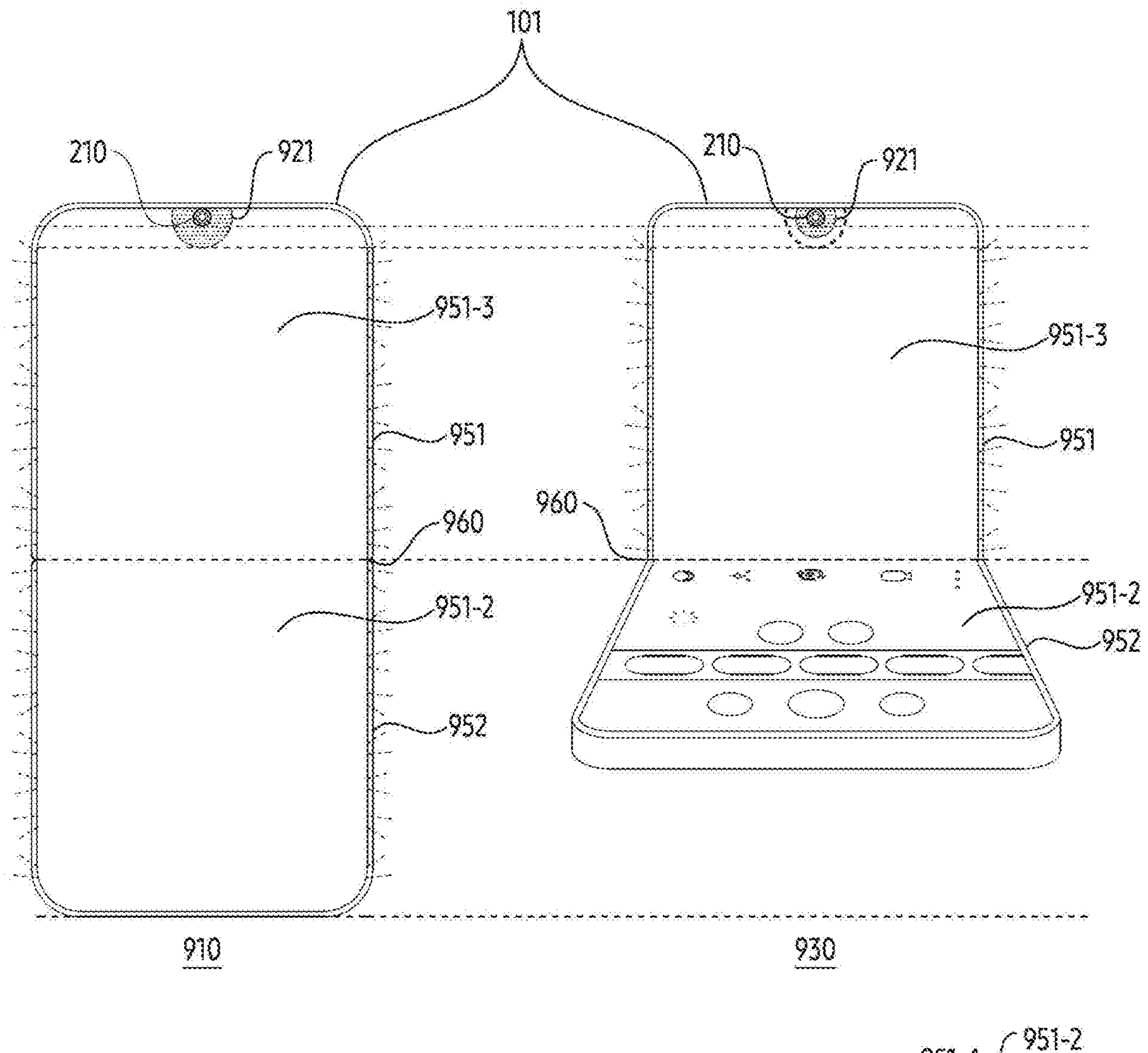
FIGS. 9A to 9B are diagrams illustrating an example operation related to an active portion of a display in case that an electronic device is a deformable electronic device deformable by an external force according to various embodiments.
Figure 9B:
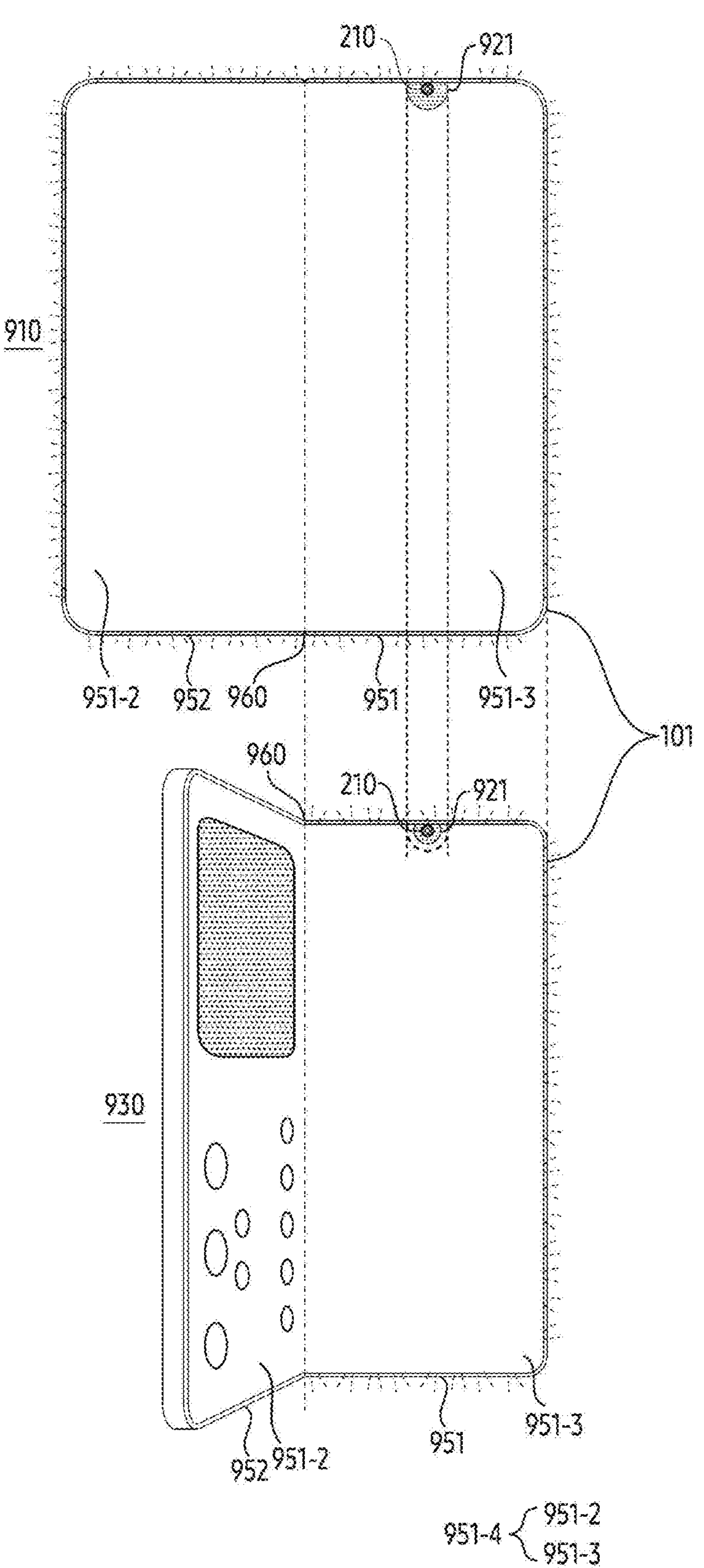

FIGS. 9A and 9B are diagrams illustrating an example operation related to an active portion of a display in case that an electronic device 101 is a deformable electronic device deformable by an external force according to various embodiments. The electronic device 101 of FIGS. 9A and 9B may correspond to the electronic device 101 of FIG. 1. The electronic device 101 may have a form factor that may be deformable by the external force.

Referring to FIGS. 9A and 9B, the electronic device 101 may include a first housing 951 and a second housing 952 connected through a folding housing 960. The first housing 951 and the second housing 952 may be coupled to the folding housing 960 to be rotatable centering around a rotation axis included in the folding housing 960. In a state 910, the first housing 951 and the second housing 952 are examples illustrating the electronic device 101 corresponding to an unfolding mode fully folded out by the folding housing 960. The unfolding mode may be referred to as outspread state (or outspreading state) and/or an unfolded mode. The second portion 921 may correspond to the second portion 422 of FIG. 4. A camera 210 may be an example of the camera 210 of FIG. 2.

According to an embodiment, the electronic device 101 may include a flexible display 951-4 that crosses a plurality of housings 951 and 952. The flexible display may be an example of a display 250 of FIG. 2. The flexible display 951-4 may be placed on a first surface of the first housing 951 and the first surface of the second housing 952. Although not shown, in FIG. 9B, the electronic device 101 according to an embodiment may include at least one camera at least partially exposed to outside through a second surface of the first housing 951 and the second surface of the second housing 952 facing away the flexible display 951-4.

Referring to FIGS. 9A and 9B, in the state 930, as the electronic device 101 according to an embodiment is gradually folded from the unfolding mode, a display 951-3 placed on the first surface of the first housing 951 among the display area of the flexible display and a display 951-2 disposed on the first surface of the second housing 952 may provide a different content, respectively. The display 951-2 may include visual objects (e.g., visual objects 410-1 of FIG. 4), a shutter (e.g., a shutter 410-2 of FIG. 4), and/or a camera change icon (e.g., a visual object 410-3 related to a camera change of FIG. 4) for performing different functions related to the camera 210. The display 951-3 placed on the first surface of the first housing 951 may be placed by overlapping at least a portion of the camera 210. For example, the electronic device 101 may identify that the plurality of housing 951 and 952 are inclined through at least one sensor (e.g., a gyro sensor) in the unfolding mode (e.g., the state 910). As an example, in case that the first housing 951 and the second housing 952 are folded at a set angle in an active state of the camera, the electronic device 101 may display an image (e.g., a first screen 410 of FIG. 4) received from the camera on the display 951-3 placed on the first surface of the first housing 951, and may display at least the portion of a User Interface (UI) related to the camera on the display 951-2 placed on the first surface of the second housing 952.

Referring to FIG. 9A, in a state 930, the electronic device 101 according to an embodiment may display a screen (a second screen 420 of FIG. 4) including the second portion 921 on the display 951-3 placed on the first surface of the first housing 951 by overlapping the image received through the camera in response to receiving a shooting input. According to an embodiment, the electronic device 101 may set the active portion of the display 951-3 placed on the first surface of the first housing 951 to an extent exceeding a critical point (e.g., a critical point 480 of FIG. 4). As the active portion decreases, intensity of light emitted from the display 951-3 may decrease.

Referring to FIG. 9B, according to an embodiment, the electronic device 101 may include the flexible display 951-4 placed on the first surface of the second housing 952. According to an embodiment, the electronic device 101 may display the first screen 410 of FIG. 4 and/or the second screen 420 of FIG. 4 on the flexible display 951-4 in the active state of the camera. The flexible display 951-4 may be an example of the display 250 of FIG. 2. The camera 210 may correspond to the camera 210 of FIG. 2. The second portion 921 may be an example of the second portion 422 of FIG. 4. According to an embodiment, the electronic device 101 may operate in the folding mode including the state 930 in which the first housing 951 and the second housing 952 are folded in by the folding housing 960. The folding mode may be referred to as a folded state and/or a folded mode.

Referring to FIG. 9B, in the state 930, according to an embodiment, the electronic device 101 may overlap and place at least the portion of the camera 210 and at least the portion of the display 951-3 disposed on the first surface of the first housing. In response to receiving the shooting input, the electronic device 101 may display the screen (e.g., the second screen 420 of FIG. 4) including the second portion 921 on the display 951-3 by overlapping the image received from the camera. The electronic device 101 may adjust the extent of the second portion 921 independently of intensity of light received through the camera 210. For example, the electronic device 101 may set the active portion of the display 951-3 exceeding the critical point 480 in response to the shooting input, and display the screen including the second portion 921 by overlapping the image. Referring to FIGS. 9A to 9B, in the state 910, an operation of adjusting the second portion 921 of the electronic device 101 may be performed similarly to the operations of FIGS. 4 to 7 described above.

Figure 10:
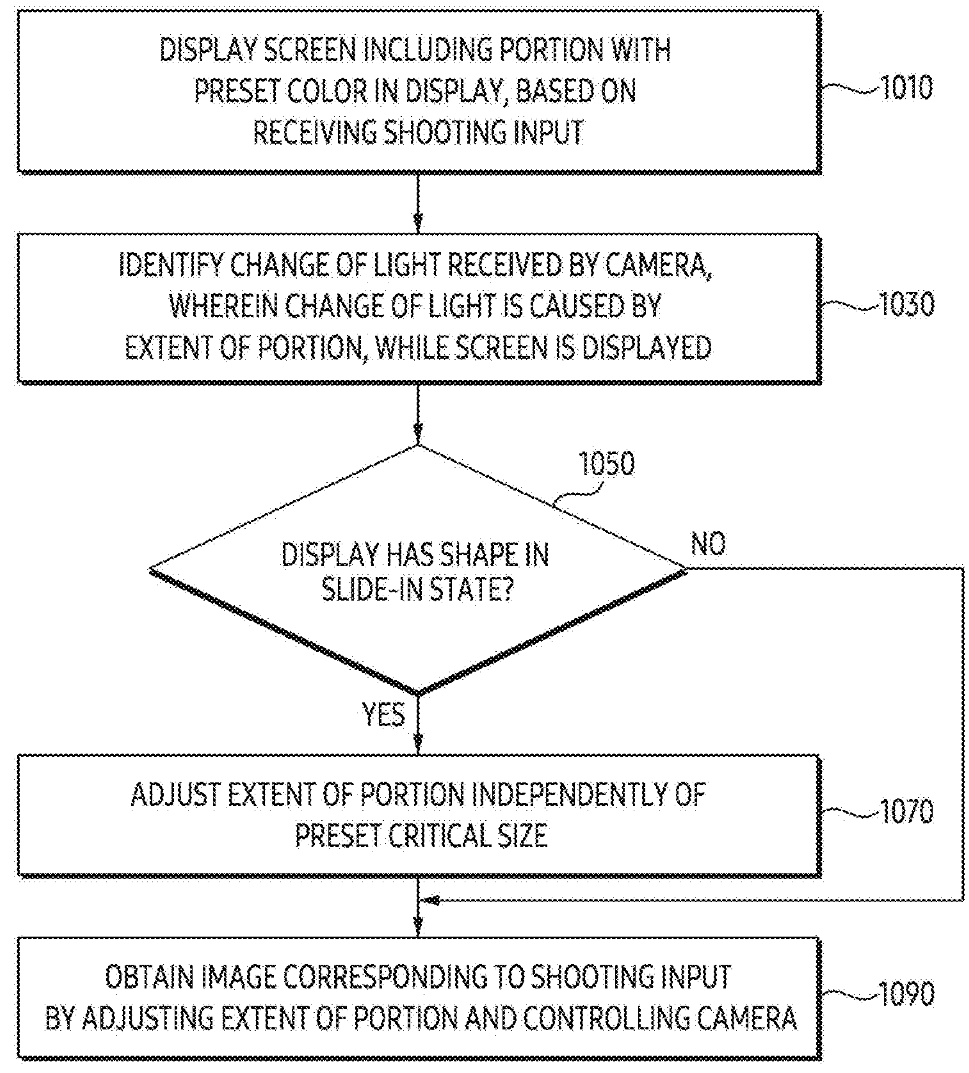
FIG. 10 is a flowchart illustrating an example operation related to an active portion of a display in case that an electronic device is a flexible electronic device according to various embodiments.

FIG. 10 is a flowchart illustrating an example operation related to an active portion of a display in case that an electronic device is a flexible electronic device according to various embodiments. The electronic device of FIG. 10 may correspond to the electronic device 101 of FIGS. 1 to 2. For example, at least one of the operations of FIG. 10 may be performed by the electronic device 101 of FIG. 1 and/or a processor 120 of FIG. 1. The operations of FIG. 10 may be related to at least one of the operations of FIGS. 6 to 7. The operations of FIG. 10 may be related to the operation of the electronic device described above in FIGS. 8A, 8B, 9A and 9B.

Referring to FIG. 10, in the operation 1010, the electronic device according to an embodiment may display a screen including a portion with a preset color in the display, based on receiving a shooting input. For example, the operation 1010 may be performed similarly to the operation 610 of FIG. 6.

Referring to FIG. 10, in the operation 1030, the electronic device according to an embodiment may identify a change of light received by the camera, wherein the change of the light is caused by an extent of the portion, while the screen is displayed. For example, the operation 1030 may be performed similarly to the operation 630 of FIG. 6.

Referring to FIG. 10, in the operation 1050, the electronic device according to an embodiment may determine whether the display has a shape in a slide-in state. For example, the electronic device may be at least one of a flexible electronic device and/or the electronic device that may be deformable by an external force. The display may be referred to a flexible display 820 of FIG. 8 and the flexible display 951-4 of FIGS. 9A and 9B. The slide-in state may be at least one of the electronic device 101 of the state 810 of FIGS. 8A and 8B and/or the electronic device 101 of the state 930 of FIGS. 9A and 9B. In case that the display does not have the shape in the slide-in state (1050—no), in the operation 1090, the electronic device may obtain an image corresponding to the shooting input by adjusting the extent of the portion and controlling the camera. In case that the display does not have the shape in the slide-in state, the state 830 of FIGS. 8A and 8B and/or the state 910 of FIGS. 9A and 9B may be included. For example, the operation 1090 may be performed similarly to the operation 650 of FIG. 6.

In case that the display has the slide-in state shape (1050—yes), in the operation 1070, the electronic device according to an embodiment may adjust the extent of the portion independently of the preset critical size. For example, the electronic device 101 may set the active portion of the display to be larger than the extent corresponding to a critical point (e.g., a critical point 480 of FIG. 4). As an example, the electronic device 101 may adjust the extent of the portion independently of intensity of light received from the camera (e.g., the camera 210 of FIG. 2). For example, the electronic device 101 may set the extent of the portion to be reduced in order to compensate for the extent of the active portion (e.g., a first portion 421 of FIG. 4) of the display. According to an embodiment, the electronic device may perform the operation 1070 and, in the operation 1090, may obtain an image corresponding to the shooting input by adjusting the extent of the portion, and controlling the camera.

Figure 11:
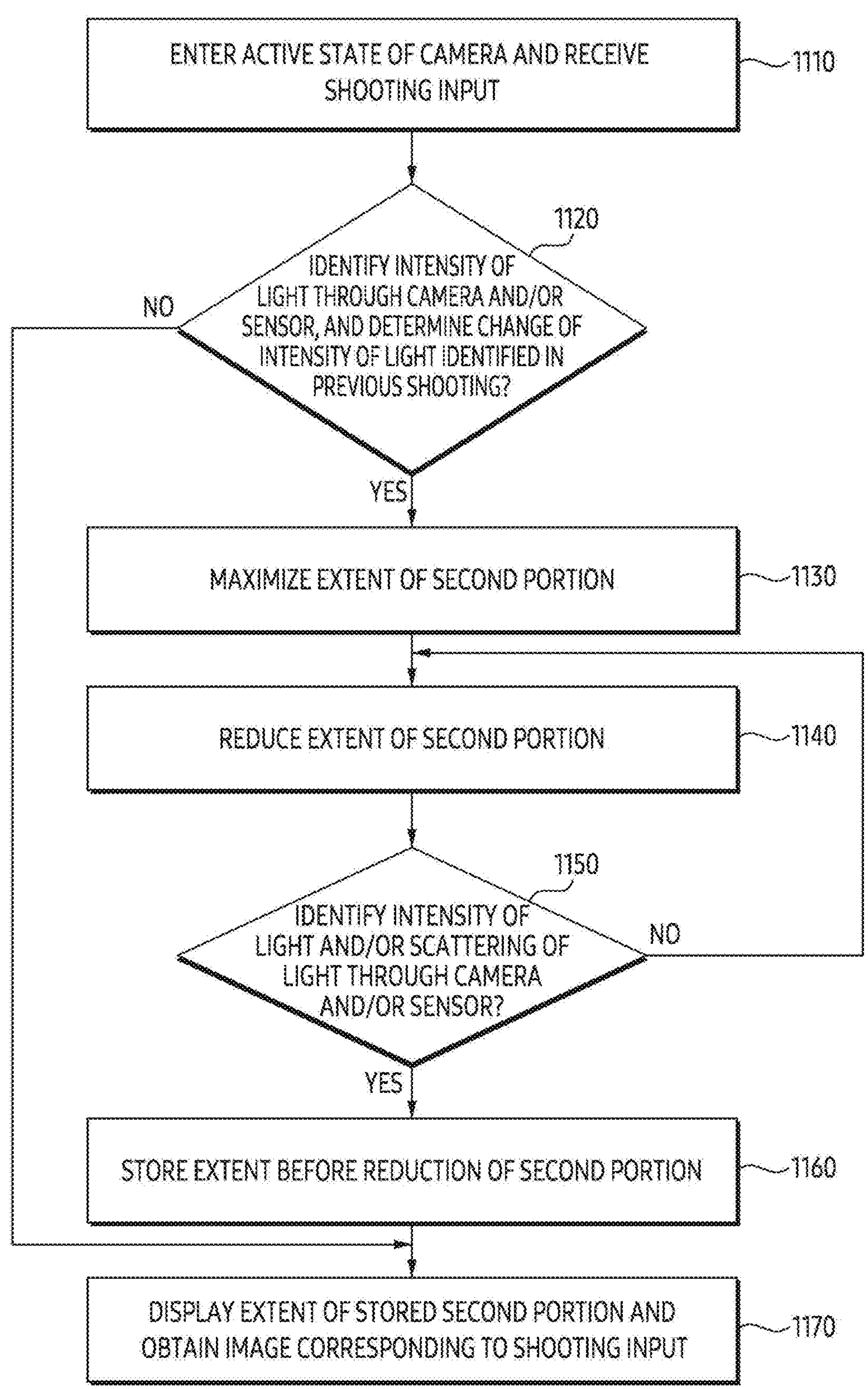
FIG. 11 is a flowchart illustrating an example operation in which an electronic device adjusts an active portion of a display in response to receiving a shooting input of a user according to various embodiments.

FIG. 11 is a flowchart illustrating an example operation in which an electronic device adjusts an active portion of a display in response to receiving a shooting input of a user according to various embodiments. The electronic device of FIG. 11 may correspond to the electronic device 101 of FIGS. 1 to 2. For example, at least one of the operations of FIG. 11 may be performed by the electronic device 101 of FIG. 1 and/or a processor 120 of the electronic device 101.

Referring to FIG. 11, in the operation 1110, the electronic device according to an embodiment may enter an active state of a camera and receive the shooting input. For example, the electronic device may receive a user input for touching and/or clicking an icon related to the camera in order to enter the active state of the camera. The electronic device may display an image received through the camera (e.g., a camera 210 of FIG. 2) on the display (e.g., a display 250 of FIG. 2) in response to the active state of the camera. The electronic device may receive the shooting input while displaying the image on the display. The electronic device may display a screen different from the image in response to receiving the shooting input. The screen may correspond to a second screen 420 of FIG. 4.

Referring to FIG. 11, in the operation 1120, the electronic device may identify the intensity of light through the camera and/or a sensor, and determine a change of intensity of light identified in a previous shooting. For example, the sensor may correspond to a sensor 230 of FIG. 2. Light may include ambient light (e.g., ambient light 310 of FIG. 3), display light (e.g., display light 320 of FIG. 3), and/or reflected light (e.g., reflected light 330 of FIG. 3). In the operation 1110, the previous shooting may refer, for example, to a shooting in which an image received through the camera (e.g., the camera 210 of FIG. 2) is obtained in response to a shooting input different from the shooting input.

Referring to FIG. 11, in case that intensity of light is identified through the camera and/or the sensor, and a change of intensity of light identified in a previous shooting is determined (1120—Yes), in the operation 1130, the electronic device according to an embodiment may maximize an extent of a second portion. For example, the second portion may refer, for example, to the second portion including at least a portion of the camera (e.g., camera 210 of FIG. 2) placed at least partially overlapping the display (e.g., a display 250 of FIG. 2). The second portion may correspond to a second portion 422 of FIG. 4. The electronic device may set to a maximum extent of the second portion. For example, the maximum extent may be the extent stored in the processor (e.g., a processor 120 of FIG. 2). For example, the electronic device may determine the maximum extent by the user input.

Referring to FIG. 11, in the operation 1140, the electronic device may reduce the extent of the second portion. For example, the electronic device may adjust the extent of the second portion based on the operation according to a graph 401 of FIG. 4 and based on a point (e.g., the first point 430-1) below a critical point (e.g., a critical point 480 of FIG. 4).

Referring to FIG. 11, in the operation 1150, the electronic device may identify intensity of light and/or a scattering of light through the camera and/or the sensor. For example, the scattering of light may occur by display light 320 of FIG. 3. The electronic device may determine intensity of light exceeding intensity of light corresponding to the critical point (e.g., the critical point 480 in FIG. 4) as the scattering of light.

In case that the scattering of light is not identified (1150—no), the electronic device may maintain reducing the extent of the second portion. For example, the electronic device may adjust the extent of the second portion corresponding to a plurality of points (points 430-1, 450-1, and 470-1 of FIG. 4) based on the operation according to the graph 401 of FIG. 4.

In response to identifying intensity of light through the camera and/or the sensor, and identifying the scattering of light (1150—yes), the electronic device according to an embodiment may store, in the operation 1160, the extent before reduction of the second portion. For example, the extent before reduction of the second portion may be the extent corresponding to the point (e.g., the third point 470-1 in FIG. 3) below the critical point. The stored extent may be referred to an extent of the second portion stored in the active state of the second camera, which is different from the active state of the camera in the operation 1110.

In case that intensity of light is identified through the camera and/or the sensor, and a change of intensity of light identified in the previous shooting is not determined (1120—no), and/or in case that the extent before reduction of the second portion is stored (1160), in the operation 1170, the electronic device according to an embodiment may display the extent of the stored second portion and obtain the image corresponding to the shooting input. For example, the image corresponding to the shooting input may include the image received by the electronic device through the camera in the operation 1110.

According to an embodiment, the electronic device may compensate for the scattering of light generated in the image obtained by the camera by adjusting intensity of light emitted from the display based on intensity of light received through the camera.

While an electronic device obtains the image including light emitted from the display using the camera, a method for adjusting intensity of light emitted from the display based on intensity of light received through the camera may be required.

As described above, according to an example embodiment, an electronic device (e.g., an electronic device 101 of FIG. 1) may include: a display (e.g., a display 250 of FIG. 2), a camera (e.g., a camera 210 of FIG. 2) at least partially visible outside through an opening formed in a display area of the display, a memory (e.g., a memory 130 of FIG. 1) storing instructions, and at least one processor (e.g., a processor 120 of FIG. 1), comprising processing circuitry, operably coupled to the display, the camera, and the memory. At least one processor, individually and/or collectively, configured to execute the instructions and configured to: control the display to display a screen (e.g., a second screen 420 of FIG. 4) including a portion (e.g., a first portion 421 of FIG. 4) with a specified color in the display, based on receiving a shooting input; identify a change of light (e.g., ambient light 310 of FIG. 3, display light 320 of FIG. 3, and reflected light 330 of FIG. 3) received by the camera, according to an extent of the portion, based on the screen being displayed; and obtain an image corresponding to the shooting input, by controlling the camera, in a state in which the extent of the portion is adjusted based on the identified change of the light.

For example, the portion may be a first portion. The specified color may be a first specified color. At least one processor, individually and/or collectively, may be configured to: control the display to display a second portion, different from the first portion, and displayed in a second specified color different from the first specified color, in the screen, on the display, wherein the second portion may include the opening formed in the display area of the display.

For example, the electronic device may further include a sensor (e.g., a sensor 230 of FIG. 2). At least one processor, individually and/or collectively, may be configured to: identify a scattering of light emitted from the first portion displayed on the display, using the sensor, in response to receiving the shooting input; and adjust the extent of the first portion, based on the identified the scattering of the light, wherein the sensor may include at least one of a touch sensor, or a humidity sensor (e.g., a humidity sensor 232 of FIG. 2).

For example, at least one processor, individually and/or collectively, may be configured to obtain the change of the light by combining brightness of a plurality of pixels included in the image being output from the camera, using a processor different from the at least one processor.

For example, at least one processor, individually and/or collectively, may be configured to control a first pixels corresponding to the first portion, among the plurality of pixels included in the display, based on the active state; and control a second pixels corresponding to the second portion, based on another state different from the active state, wherein first specified color may be white and the second specified color may be black.

For example, the camera may be a first camera. The electronic device may further include a second camera, visible at least partially to outside through a second surface, facing away a first surface of the electronic device, in which the first camera is placed, and one or more LEDs, emitting light toward the second surface. At least one processor, individually and/or collectively, may be configured to: control the display to display a preview image, received from the second camera, and different from the image in the display, based on the active state of the second camera; operate the one or more LEDs, in a state displaying the preview image received from the second camera, in the display, based on receiving another shooting input; and obtain a second image corresponding to the other shooting input from the second camera, while the one or more LEDs are operating.

For example, the screen may be a first screen. At least one processor, individually and/or collectively, may be configured to: control the display to display a second screen including at least a portion of the image received from the camera, in the display, based on the active state of the camera; change from the second screen to the first screen, based on receiving the shooting input; control the display to display the first screen based on other brightness exceeding brightness of the second screen, in response to being changed to the first screen; and obtain the second screen corresponding to the shooting input.

For example, at least one processor, individually and/or collectively, may be configured to: control the display to display the preview image (e.g., a preview image 543 of FIG. 5) in a third portion different from the first portion and the second portion, on the display, based on at least the portion of the image received from the camera; and adjust the extent of the first portion and the extent of the second portion displayed on the display, based on the identified scattering of light.

For example, at least one processor, individually and/or collectively, may be configured to store the adjusted extent of the first portion and adjusted the extent of the second portion, in response to obtaining the image corresponding to the shooting input.

For example, at least one processor, individually and/or collectively, may be configured to control the display to display the stored extent of the first portion and the stored extent of the second portion, in response to receiving another shooting input based on the shooting input.

As described above, according to an example embodiment, an electronic device (e.g., the electronic device 101 of FIG. 1) may include: a display (e.g., the display 250 of FIG. 2), a camera (e.g., the camera 210 of FIG. 2) at least partially visible outside through an opening formed in the display area of the display, a memory (e.g., the memory 130 of FIG. 1) storing instructions, and at least one processor (e.g., the processor 120 of FIG. 1), comprising processing circuitry, operably coupled to the display, the camera, and the memory. At least one processor, individually and/or collectively, may be configured to execute the instructions, and configured to: control the display to display a first screen (e.g., the first screen 410 of FIG. 4) to display the preview image received from the camera, in the display; control the display to repeatedly display a second screen (e.g., the second screen 420 of FIG. 4), including the first portion (e.g., the first portion 421 of FIG. 4) having a first specified color, and including a second portion (e.g., the second portion 422 of FIG. 4) having a second specified color different from the first specified color and including the opening, overlapping on the first screen, in response to receiving a shooting input, based on displaying the first screen; identify the change of brightness of the preview image according to light emitted from the first portion, by adjusting the extent of the first portion, based on repeatedly displaying the second screen; and obtain the image corresponding to the shooting input, using the first portion in the second screen, having the extent of the first portion adjusted based on the change of the brightness.

For example, the electronic device may further include a sensor (e.g., the sensor 230 of FIG. 2). At least one processor, individually and/or collectively, may be configured to: identify the scattering of light emitted from the first portion displayed on the display, using the sensor, in response to receiving the shooting input; and adjust the extent of the first portion, based on the identified the scattering of light, wherein the sensor may include at least one of the touch sensor, or the humidity sensor (e.g., a humidity sensor 232 of FIG. 2).

For example, at least one processor, individually and/or collectively, may be configured to: adjust a number of repetitions repeatedly displaying the second screen, based on the identified scattering of light; store the adjusted number of repetitions in the memory; and control the display to display the second screen overlapping the first screen, based on the stored the number of repetitions, in response to receiving another shooting input based on the shooting input.

For example, at least one processor, individually and/or collectively, may be configured to: change from the first screen to the second screen, in response to receiving the shooting input; and control the display to display the second screen, based on another brightness exceeding brightness of the first screen, in response to being changed to the second screen.

For example, the electronic device may further include a housing. The electronic device may further include an actuator configured to insert the display into the housing or extract the display from the housing. At least one processor, individually and/or collectively, may be configured to: adjust the extent of the first portion displayed on the display, by controlling the actuator, by inserting the display into the housing or extracting the display from the housing, in response to receiving the shooting input.

As described above, a method of the electronic device (e.g., the electronic device 101 in FIG. 1) according to an example embodiment may include: displaying a screen (e.g., the second screen 420 in FIG. 4) including a portion (e.g., the first portion 421 in FIG. 4) with a specified color in a display (e.g., the display 250 in FIG. 2), based on receiving a shooting input; identifying a change of light (e.g., ambient light 310 of FIG. 3, display light 320 of FIG. 3, and reflective light 330 of FIG. 3) received by a camera (e.g., the camera 210 of FIG. 2) according to an extent of the portion, based on the screen being displayed; and obtaining the image corresponding to the shooting input, by controlling the camera, in a state in which the extent of the portion adjusted based on the identified change of light.

For example, the portion may be a first portion. The specified color may be a first specified color. The method of electronic device may include: displaying the second portion, different from the first portion, and displayed in a second specified color different from the first specified color, in the screen, on the display. The second portion may include the opening formed in the display area of the display.

For example, the electronic device may further include a sensor (e.g., the sensor 230 of FIG. 2). The method of electronic device may include: identifying the scattering of light emitted from the first portion displayed on the display, using the sensor, in response to receiving the shooting input; and adjusting the extent of the first portion, based on the identified the scattering of light.

For example, the method of the electronic device may include storing the adjusted extent of the first portion and the extent of the second portion, in response to obtaining the image corresponding to the shooting input.

For example, the method of the electronic device may include displaying the stored first portion and the stored second portion, in response to receiving the shooting input.

As described above, a method of an electronic device (e.g., electronic device 101 in FIG. 1) according to an example embodiment may include: displaying a first screen (e.g., the first screen 410 in FIG. 4) to display the preview image received from a camera (e.g., the camera 210 in FIG. 2) in a display (e.g., the display 250 in FIG. 2; repeatedly displaying a second screen (e.g., the second screen 420 of FIG. 4), including a first portion (e.g., the first portion 421 of FIG. 4) having a first specified color, and including a second portion (e.g., the second portion 422 of FIG. 4) having a second specified color different from the first specified color and including an opening, overlapping on the first screen, in response to receiving a shooting input, based on displaying the first screen; identifying the change of brightness of the preview image according to light emitted from the first portion, by adjusting the extent of the first portion, based on repeatedly displaying the second screen; and obtaining the image corresponding to the shooting input, using the first portion in the second screen, having the extent of the first portion adjusted based on the change of the brightness.

The device described above may be implemented as a hardware component, a software component, and/or a combination of a hardware component and a software component. For example, a device and a component described in the various example embodiments may be implemented using one or more general-purpose computer or special-purpose computer, such as a processor, a controller, an arithmetic logic unit (ALU), a digital signal processor, a microcomputer, a field programmable gate array (FPGA), a programmable logic unit (PLU), a microprocessor, or any other device capable of executing and responding to instruction. The processing device may perform an operating system (OS) and one or more software application executed on the operating system. Also, the processing device may access, store, manipulate, process, and generate data in response to the execution of software. For convenience of understanding, one processing device is sometimes described as being used, but a person with ordinary skill in the art may see that the processing device may include a plurality of processing element and/or a plurality of type of processing element. For example, the processing device may include a plurality of processor or one processor and one controller. Also, other processing configuration, such as a parallel processor, is possible.

The software may include a computer program, a code, an instruction, or a combination of one or more thereof, and may configure the processing device to operate as desired or command the processing device independently or collectively. Software and/or data may be embodied in any type of machine, a component, a physical device, a computer storage medium or a device to be interpreted by the processing device or to provide instruction or data to the processing device. Software may be distributed over a networked computer system, stored or executed in a distributed manner. Software and data may be stored on one or more computer-readable recording medium.

The method according to an embodiment may be implemented in the form of program instruction that may be executed through various computer means and recorded on a computer-readable medium. In this case, the medium may continue to store a program executable by a computer, or may temporarily store the program for execution or download. The medium may be a variety of recording or storage means in the form of a single or several pieces of hardware combination, but may be distributed on a network, not limited to a medium directly connected to a computer system. As an example of media, there is something to be configured to store program instructions including magnetic medium such as a hard disk, a floppy disk and a magnetic tape, optical recording medium such as CD-ROM and DVD, magneto-optical medium such as a floptical disk, and ROM, RAM, flash memory, and the like. Also, as an example of other medium, there are recording medium or storage medium managed by an app store that distributes an application, or a site that supply or distribute various other software, and a server, and the like.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:

a display;

a camera;

memory storing instructions; and at least one processor comprising processing circuitry, wherein the instructions, when executed by the at least one processor individually or in combination, cause the electronic device to:

display a preview screen using images obtained via the camera, via the display, while the preview screen is displayed using images obtained via the camera, receive an input for obtaining an image via the camera, based on the input, display a screen functioning as a flash of the camera via the display, the screen including:

a first portion having a first preset color, and a second portion having a second preset color darker than the first preset color, wherein the second portion of the screen is surrounded by the first portion of the screen, change a size of the first and second portions of the screen displayed via the display, while a size of the first and second portions of the screen is being changed, identify a light intensity via the camera, based on changes in the light intensity identified via the camera while a size of the first and second portions of the screen is being changed, determine a size of the first portion of the screen and the size of the second portion of the screen that are to be used with respect to obtaining the image in accordance with the input, and while the screen including the first portion having the determined size and the second portion having the determined size is displayed, obtain the image via the camera in accordance with the input.

2. The electronic device of claim 1, further comprising:

a sensor;

wherein at least one processor, individually and/or collectively, is configured to:

identify a scattering of light emitted from the first portion displayed on the display, using the sensor, in response to receiving the input, adjust the size of the first portion, based on the identified the scattering of the light, and wherein the sensor comprises:

at least one of a touch sensor, and/or a humidity sensor.

3. The electronic device of claim 1, wherein at least one processor, individually and/or collectively, is configured to:

obtain the changes of the light intensity by combining brightness of a plurality of pixels included in an image being output via the camera, using another processor different from the at least one processor.

4. The electronic device claim 1, wherein at least one processor, individually and/or collectively, is configured to:

control a first pixels corresponding to the first portion, among a plurality of pixels included in the display, based on an active state;

control a second pixels corresponding to the second portion, based on another state different from the active state;

wherein the first preset color is white; and wherein the second preset color is black.

5. The electronic device claim 1, wherein the camera a first camera disposed under an opening defined in a display area of the display;

wherein the electronic device further comprises:

a second camera, visible at least partially outside through a second surface, facing away a first surface of the electronic device, in which the first camera is placed; and one or more LEDs, configured to emit light toward the second surface;

wherein at least one processor, individually and/or collectively, is configured to:

control the display to display a preview image, received from the second camera, and different from the image in the display, based on an active state of the second camera, operate the one or more LEDs, in a state displaying the preview image received from the second camera, in the display, based on receiving another input, and obtain a second image corresponding to the other input from the second camera, based on the one or more LEDs operating.

6. The electronic device of claim 1, wherein the screen is a flash screen;

wherein at least one processor, individually and/or collectively, is configured to:

control the display to display the preview screen including at least a portion of an image received via the camera, in the display, based on an active state of the camera;

change from the preview screen to the flash screen, based on receiving the input;

control the display to display the flash screen based on other brightness exceeding brightness of the preview screen, in response to being changed to the flash screen, and obtain the image displayed on the preview screen corresponding to the input.

7. The electronic device of claim 1, wherein at least one processor, individually and/or collectively, is configured to:

control the display to display a preview image in a third portion different from the first portion and the second portion, on the display, based on at least a portion of the image received via the camera, and adjust the size of the first portion and the size of the second portion displayed on the display, based on an identified scattering of light.

8. The electronic device of claim 1, wherein at least one processor, individually and/or collectively, is configured to:

store the determined size of the first portion and the determined sizeof the second portion, in response to obtaining the image corresponding to the input.

9. The electronic device of claim 1, wherein at least one processor, individually and/or collectively, is configured to:

control the display to display the stored size of the first portion and the stored size of the second portion, in response to receiving another input after the input.

10. A method of operating an electronic device, the method comprising:

displaying a preview screen using images obtained via a camera, via a display;

while the preview screen is displayed using images obtained via the camera, receiving an input for obtaining an image via the camera disposed under the display, based on the input, displaying a screen functioning as a flash of the camera via the display, the screen including:

a first portion having a first preset color; and a second portion having a second preset color darker than the first preset color, wherein the second portion of the screen is surrounded by the first portion of the screen, gradually changing a size of the first and second portions of the screen displayed via the display, while a size of the first and second portions of the screen is being gradually changed, identifying a light intensity via the camera, based on changes in the light intensity identified via the camera while a size of the first and second portions of the screen is being gradually changed, determining a size of the first portion of the screen and the size of the second portion of the screen that are to be used with respect to obtaining the image in accordance with the input, and while the screen including the first portion having the determined size and the second portion having the determined size is displayed, obtaining the image via the camera in accordance with the input.

11. The method of claim 10, wherein the electronic device further comprises a sensor; and wherein identifying the changes of light comprises:

identifying a scattering of light intensity emitted from the first portion displayed on the display, using the sensor, in response to receiving the input; and adjusting the size of the first portion, based on the identified the scattering of light intensity.

12. The method of claim 10, wherein adjusting the size of the first portion comprises, storing the determined size of the first portion and the determined size of the second portion in a memory, in response to obtaining the image in accordance with the input.

13. The method of claim 10, wherein storing the determined size of the first portion and the determined size of the second portion comprises:

displaying the stored size of the first portion and the stored size of the second portion, in response to receiving the input.

14. An electronic device, comprising:

a display;

a camera;

memory storing instructions;

processor, comprising processing circuitry, operably coupled to the display, the camera, and the memory, and configured to execute the instructions to:

control the display to display a first screen to display a preview image received from the camera, in the display, control the display to repeatedly display a second screen, including a first portion having a first preset color, and including a second portion having a second preset color different from the first preset color and including an opening, overlapping on the first screen, in response to receiving a input, based on displaying the first screen, identify a change of brightness of the preview image according to light emitted from the first portion, by adjusting a size of the first portion, based on repeatedly displaying the second screen, and obtain the image corresponding to the input, using the first portion in the second screen, having the size of the first portion adjusted based on the change of the brightness.

15. The electronic device of claim 14, further comprising:

a sensor;

wherein the processor comprises at least one processor, and is individually and/or collectively configured to:

identify a scattering of light emitted from the first portion displayed on the display, using the sensor, in response to receiving the input, and adjust the size of the first portion, based on the identified scattering of the light, and wherein the sensor comprises:

at least one of a touch sensor, or a humidity sensor.

16. The electronic device of claim 15, wherein the processor comprises at least one processor, and is individually and/or collectively configured to:

adjust a number of repetitions repeatedly displaying the second screen, based on the identified scattering of light, store the adjusted number of repetitions, and control the display to display the second screen overlapping the first screen, based on the stored the number of repetitions, in response to receiving another input after the input.

17. The electronic device of claim 14, wherein processor comprises at least one processor, and is individually and/or collectively configured to:

change from the first screen to the second screen, in response to receiving the input, and control the display to display the second screen, based on another brightness exceeding brightness of the first screen, in response to being changed to the second screen.

18. The electronic device of claim 14, further comprising:

a housing; and an actuator configured to insert the display into the housing or extract the display from the housing;

wherein the processor is configured to:

adjust the size of the first portion displayed on the display, by controlling the actuator, by inserting the display into the housing or extracting the display from the housing, in response to receiving the input.

* * * * *